US011204630B2

United States Patent
Cho

(10) Patent No.: US 11,204,630 B2
(45) Date of Patent: Dec. 21, 2021

(54) CONVERTIBLE-TYPE ELECTRONIC DEVICE HAVING DOUBLE-AXIS HINGE DEVICE

(71) Applicant: Samsung Electronics Co., Ltd., Gyeonggi-do (KR)

(72) Inventor: Hyunje Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/957,843

(22) PCT Filed: Dec. 26, 2018

(86) PCT No.: PCT/KR2018/016655
§ 371 (c)(1),
(2) Date: Jun. 25, 2020

(87) PCT Pub. No.: WO2019/132507
PCT Pub. Date: Jul. 4, 2019

(65) Prior Publication Data
US 2021/0064097 A1  Mar. 4, 2021

(30) Foreign Application Priority Data
Dec. 27, 2017  (KR) .......................... 10-2017-0180784

(51) Int. Cl.
*G06F 1/16* (2006.01)

(52) U.S. Cl.
CPC .......... *G06F 1/1681* (2013.01); *G06F 1/1618* (2013.01)

(58) Field of Classification Search
None
See application file for complete search history.

(56) References Cited

U.S. PATENT DOCUMENTS 9,009,919 B1  4/2015 Chiang
9,342,101 B2*  5/2016 Hsu ....................... G06F 1/1679
(Continued)

FOREIGN PATENT DOCUMENTS

CN  202579633 U  12/2012
JP  2017-537375 A  12/2017
(Continued)

OTHER PUBLICATIONS

European Search Report dated Dec. 17, 2020.

*Primary Examiner* — Anthony Q Edwards
*Assistant Examiner* — Rashen E Morrison
(74) *Attorney, Agent, or Firm* — Cha & Reiter, LLC

(57) ABSTRACT

The invention provides an electronic device comprising: a first housing; a second housing; and a double-axis hinge housing connecting the first housing and the second housing such that the second housing can rotate from the first housing around a first hinge-axis or around a second hinge-axis that is parallel to the first hinge-axis, respectively. The double-axis hinge housing may contain a double-axis hinge device comprising a first hinge device connecting the first housing and the double-axis hinge housing such that the same can rotate around the first hinge-axis, and a second hinge device which is parallel to the first hinge device, and which connects the second housing and the double-axis hinge housing such that the same can rotate around the second hinge-axis. The double-axis hinge housing may comprise a cam arranged between the first and second hinge devices to be able to rotate. The cam may be set so as to interwork with the first hinge device at a first rotational angle such that the cam prevents a rotating operation of the first housing and allows a rotating operation of the second housing. The cam may be set so as to interwork with the second hinge device at a second rotational angle such that (Continued)

the cam prevents a rotating operation of the second housing and allows a rotating operation of the second housing.

16 Claims, 28 Drawing Sheets

(56) References Cited

U.S. PATENT DOCUMENTS

| | | | | |
|---|---|---|---|---|
| 9,856,909 | B1* | 1/2018 | Hsu | E05D 3/122 |
| 10,227,808 | B2* | 3/2019 | Siddiqui | G06F 1/1641 |
| 10,365,686 | B2* | 7/2019 | Tucker | G06F 1/1618 |
| 10,558,245 | B2* | 2/2020 | Morrison | G06F 1/1618 |
| 2008/0109995 | A1* | 5/2008 | Kuwajima | H04M 1/022 |
| | | | | 16/354 |
| 2009/0070961 | A1* | 3/2009 | Chung | E05D 3/122 |
| | | | | 16/354 |
| 2009/0144934 | A1* | 6/2009 | Kitagawa | G06F 1/1616 |
| | | | | 16/320 |
| 2011/0157780 | A1* | 6/2011 | Wang | G06F 1/1681 |
| | | | | 361/679.01 |
| 2012/0042473 | A1* | 2/2012 | Wang | G06F 1/1681 |
| | | | | 16/319 |
| 2012/0096678 | A1* | 4/2012 | Zhang | G06F 1/1681 |
| | | | | 16/302 |
| 2012/0192381 | A1* | 8/2012 | Zhang | G06F 1/1681 |
| | | | | 16/366 |
| 2013/0077041 | A1* | 3/2013 | Chih | G02C 5/146 |
| | | | | 351/116 |
| 2013/0135809 | A1* | 5/2013 | Uchiyama | G06F 1/1681 |
| | | | | 361/679.09 |
| 2013/0194741 | A1* | 8/2013 | Uchiyama | G06F 1/1681 |
| | | | | 361/679.26 |
| 2013/0318746 | A1* | 12/2013 | Kuramochi | G06F 1/1681 |
| | | | | 16/342 |
| 2014/0360296 | A1* | 12/2014 | Hsu | G06F 1/1618 |
| | | | | 74/98 |
| 2015/0092331 | A1* | 4/2015 | Kinoshita | G06F 1/1616 |
| | | | | 361/679.09 |
| 2015/0309541 | A1* | 10/2015 | Horng | E05D 11/0054 |
| | | | | 16/250 |
| 2016/0034004 | A1* | 2/2016 | Park | E05D 3/12 |
| | | | | 16/330 |
| 2016/0097227 | A1* | 4/2016 | Hsu | F16B 1/00 |
| | | | | 16/354 |
| 2016/0132076 | A1 | 5/2016 | Bitz et al. | |
| 2016/0259379 | A1* | 9/2016 | Uchiyama | G06F 1/1618 |
| 2017/0293324 | A1 | 10/2017 | Kuramochi | |
| 2018/0059735 | A1* | 3/2018 | Tazbaz | G06F 1/1677 |
| 2019/0243426 | A1* | 8/2019 | Morrison | E05D 11/0054 |

FOREIGN PATENT DOCUMENTS

| | | |
|---|---|---|
| KR | 10-0949839 B1 | 3/2010 |
| KR | 10-2013-0071317 A | 6/2013 |
| KR | 10-1497211 B1 | 3/2015 |
| KR | 10-2016-0015021 A | 2/2016 |

* cited by examiner

CONVERTIBLE-TYPE ELECTRONIC DEVICE HAVING DOUBLE-AXIS HINGE DEVICE

CROSS-REFERENCE TO RELATED APPLICATION(S)

This application is a National Phase Entry of PCT International Application No. PCT/KR2018/016655, which was filed on Dec. 26, 2018 and claims priority to Korean Patent Application No. 10-2017-0180784, which was filed on Dec. 27, 2017, the contents of which are incorporated herein by reference.

TECHNICAL FIELD

Various embodiments of the disclosure relate to a convertible-type electronic device having a double-axis hinge device.

BACKGROUND ART

Portable electronic devices may include notebook PCs, tablet PCs, smartphones, etc. For example, a notebook PC may have a display to be configured and used to be rotatable up to 180 degrees, or may have a display rotatable up to 360 degrees so that the notebook PC can be also used as a tablet PC.

A general notebook PC has a display rotatably connected to a notebook body by a hinge device. The hinge device provides a force for stopping the display at an angle allowing comfortable viewing or typing, so as to enable a comfortable typing motion in various modes and a comfortable viewing of a displayed information. For example, one of a single-axis hinge device and a double-axis hinge device is configured as a hinge device, and the double-axis hinge device enables an electronic device to have various modes (e.g.; viewing mode or typing mode, etc.).

DISCLOSURE OF INVENTION

Technical Problem

For comfortable use of an electronic device in various modes, the electronic device needs to employ a double-axis hinge device. However, a double-axis hinge device includes a large number of parts, and thus has many parts which require tolerance management.

Solution to Problem

Various embodiments of the disclosure are to reduce the number of parts subject to a tolerance management, by providing an electronic device which includes a double-axis hinge device providing two rotation axes by using an operation of a cam rotating.

Various embodiments of the disclosure are to provide convenience of use in various modes, for example, a viewing mode, a typing mode, a tablet PC mode, and the like, by providing an electronic device provided with an operable mode switch sliding device.

An electronic device according to various embodiments of the disclosure may include: a first housing; a second housing; and a double-axis hinge housing connecting the first housing and the second housing such that the second housing can rotate from the first housing around a first hinge-axis or a second hinge-axis parallel to the first hinge-axis, wherein the double-axis hinge housing includes: a first hinge device which rotatably connects the first housing and the double-axis hinge housing with reference to the first hinge-axis; and a cam, which receives a double-axis hinge device including a second hinge device parallel to the first hinge device and rotatably connecting the second housing and the double-axis hinge housing with reference to the second hinge-axis, is rotatably arranged between the first and the second hinge device, is set to interlock with the first hinge device at a first rotation angle so as to block a rotation operation of the first housing and allow a rotation operation of the second housing, and is set to interlock with the second hinge device at a second rotation angle so as to block a rotation operation of the second housing and allow a rotation operation of the first housing.

Advantageous Effects of Invention

An electronic device according to various embodiments of the disclosure includes a double-axis hinge device, in which the number of parts subjected to tolerance management is reduced and product reliability can be thus improved.

An electronic device according to various embodiments of the disclosure can selectively switch modes, thereby being able to be conveniently used in various kinds of modes.

BEST MODE FOR CARRYING OUT THE INVENTION

Figure 1A:
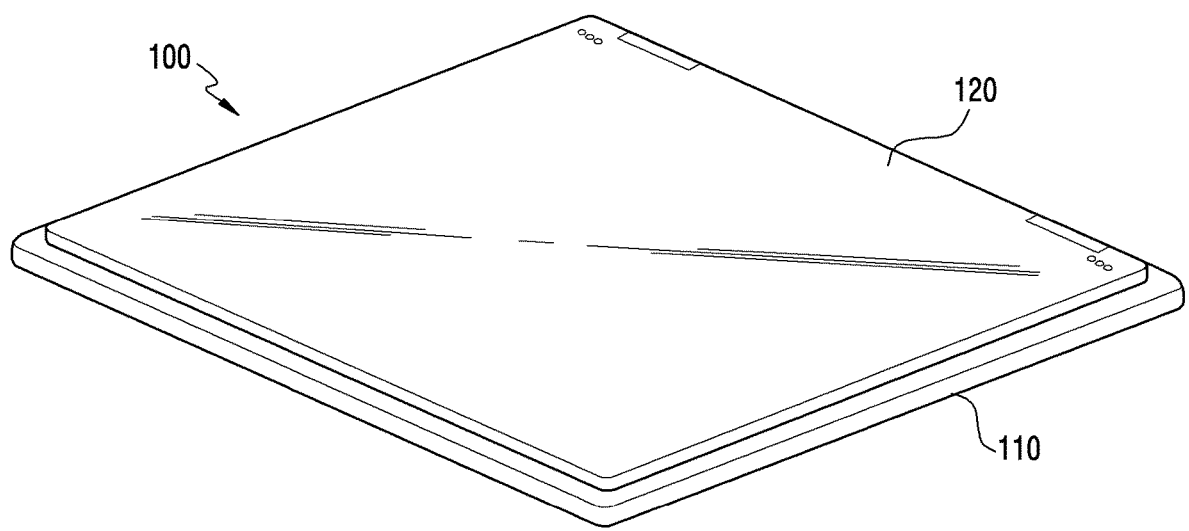
FIG. 1A is a perspective view illustrating an electronic device in a closed state according to various embodiments of the disclosure.

Hereinafter, various embodiments of the disclosure will be described with reference to the accompanying drawings. However, it should be understood that they are not intended to limit the technological features set forth herein to particular embodiments and the disclosure includes various changes, equivalents, or alternatives for the embodiments of the disclosure. With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element suh as component) and does not exclude the existence of additional features.

As used herein, the expression "A or B", "at least one of A and/or B", or "one of more of A and/or B" may include all possible combinations of items enumerated together. For example, "A or B", " " at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and does not limit the corresponding elements. These expressions may be used to distinguish between one element and any other element. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it could be understood that when an element (e.g., first element) is referred to as being "directly connected," or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3

(MP3) player, a mobile medical device, a camera, and a wearable device (e.g., smart glasses, head-mounted device (HMD), electronic clothing, electronic bracelet, electronic necklace, electronic appcessory, electronic tattoo, smart mirror, or smart watch).

According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be flexible, or may be a combination of one or more of the aforementioned various devices. According to some embodiments, the electronic device may be a flexible electronic device or foldable electronic device. Further, the electronic device according to various embodiments of the disclosure is not limited to the aforementioned devices, and may include a new electronic device according to the development of technology.

Figure 1B:
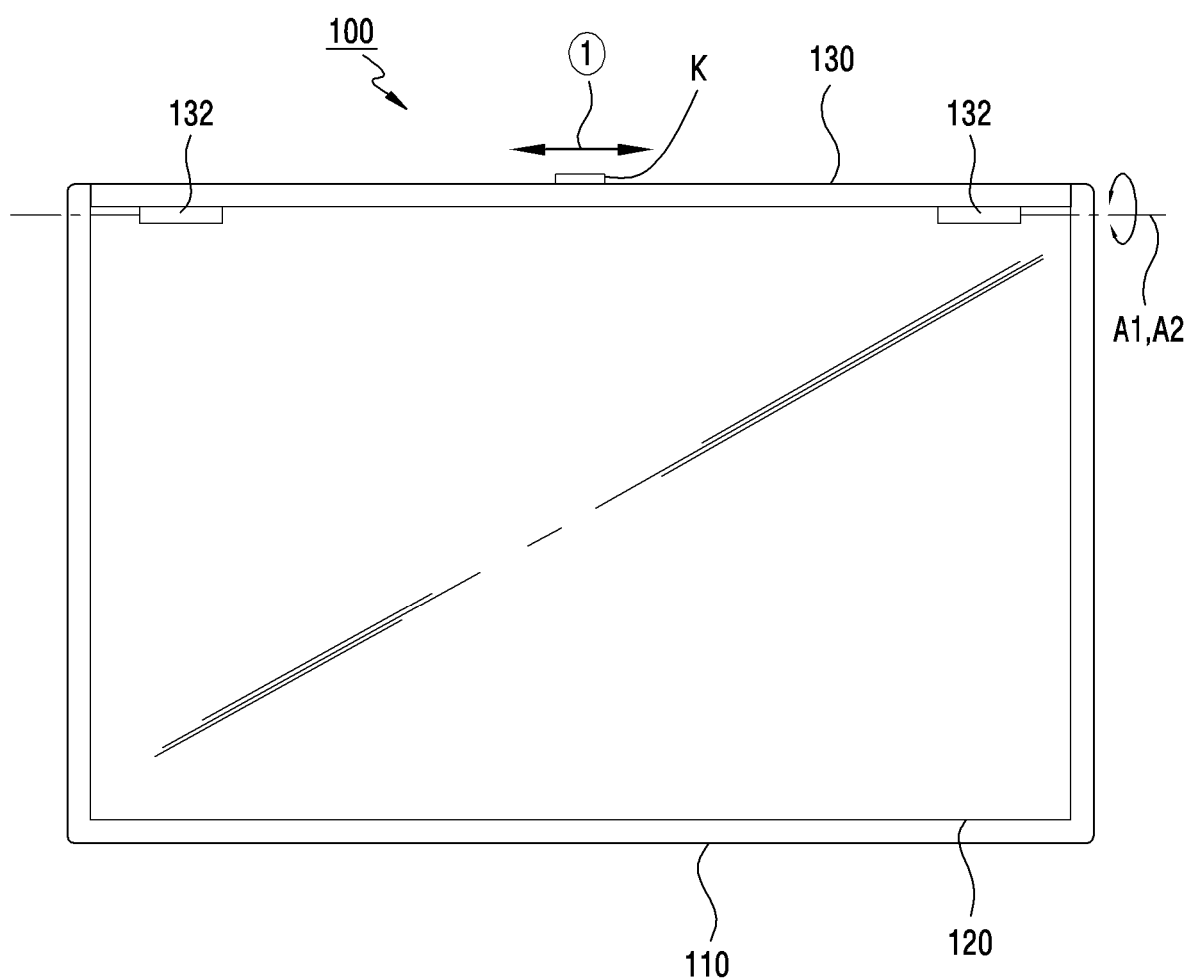
FIG. 1B is a plan view illustrating the electronic device in a closed state according to various embodiments of the disclosure.
Figure 1C:
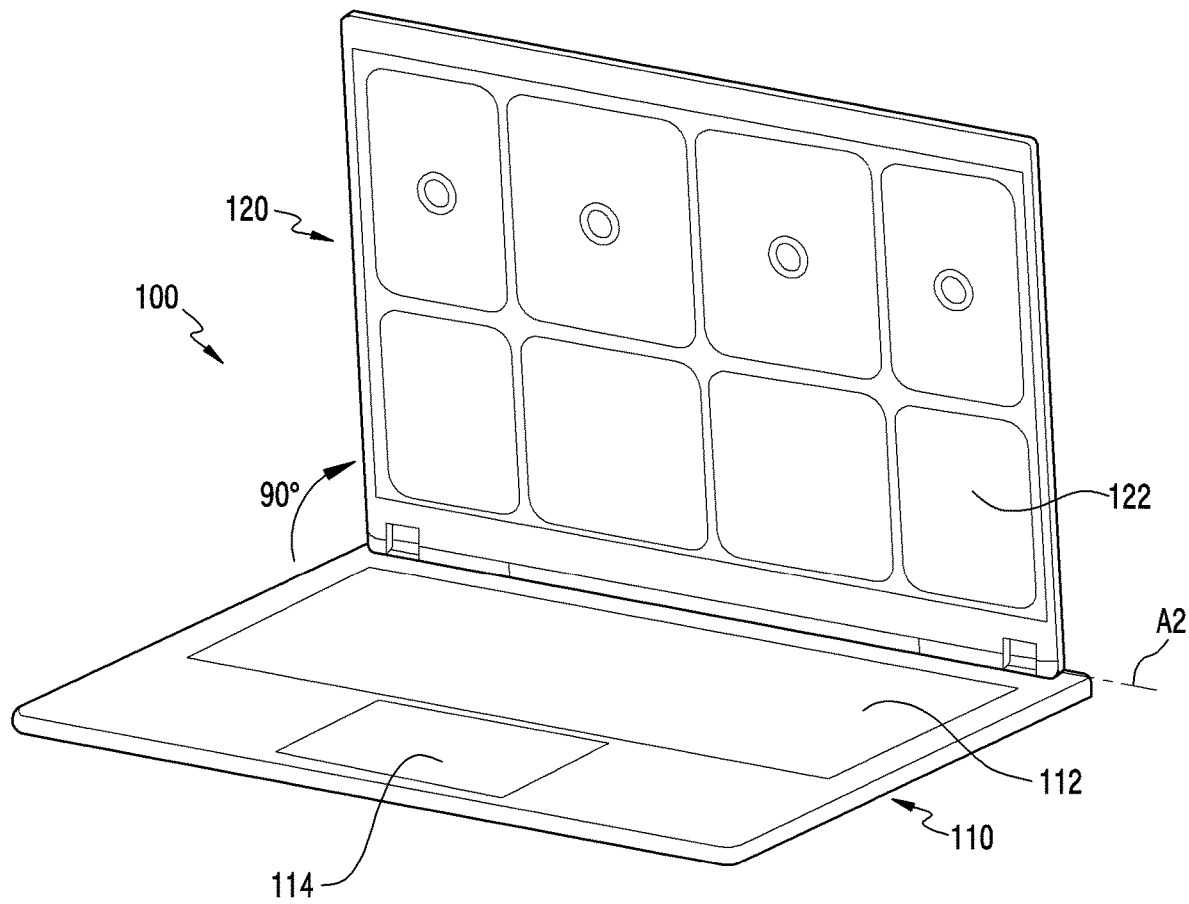
FIG. 1C is a perspective view illustrating the electronic device in a state where a second housing has been rotated about 90 degrees from a first housing according to various embodiments of the disclosure.
Figure 1D:
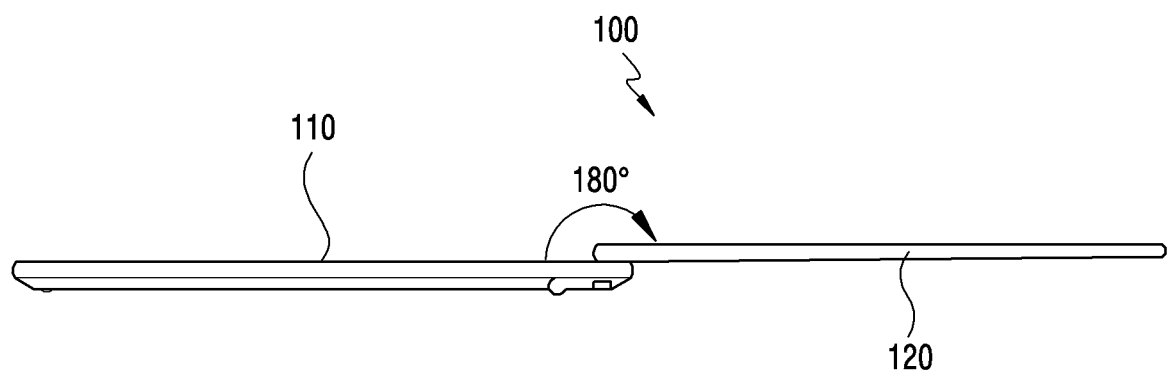
FIG. 1D is a side view illustrating the electronic device in a state where the second housing has been rotated about 180 degrees from the first housing according to various embodiments of the disclosure.
Figure 1E:
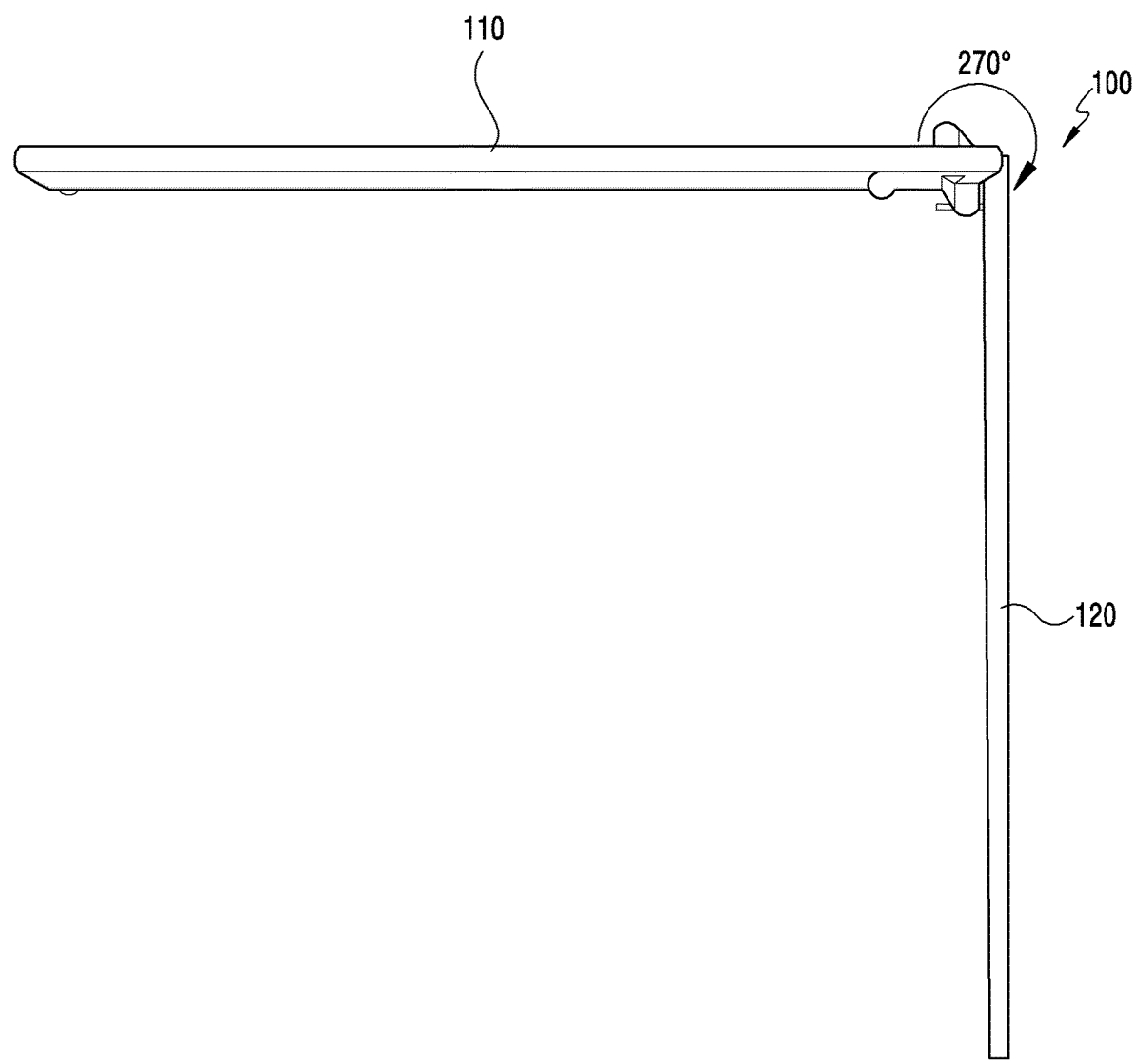
FIG. 1E is a side view illustrating the electronic device in a state where the second housing has been rotated about 270 degrees from the first housing according to various embodiments of the disclosure.
Figure 1F:
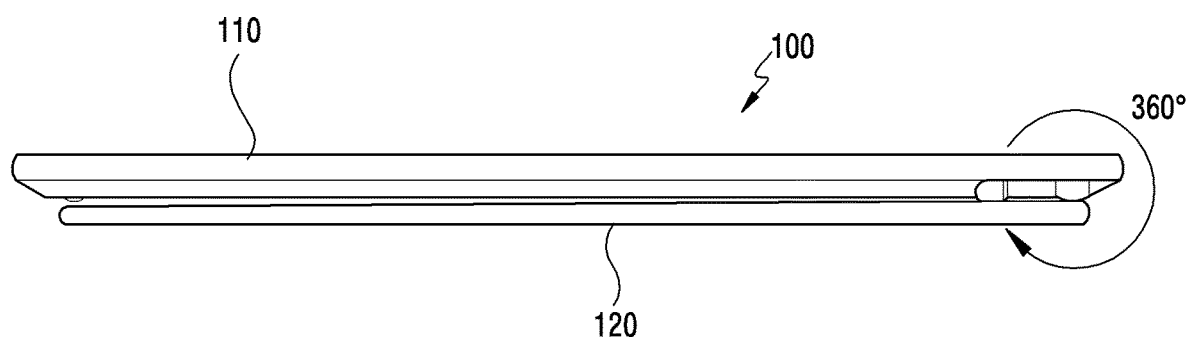
FIG. 1F is a side view illustrating the electronic device in a state where the second housing has been rotated about 360 degrees from the first housing according to various embodiments of the disclosure.

FIG. 1A is a perspective view illustrating an electronic device in a closed state according to various embodiments of the disclosure. FIG. 1B is a plan view illustrating the electronic device in a closed state according to various embodiments of the disclosure. FIG. 1C is a perspective view illustrating the electronic device in a state where a second housing has been rotated about 90 degrees from a first housing according to various embodiments of the disclosure. FIG. 1D is a side view illustrating the electronic device in a state where the second housing has been rotated about 180 degrees from the first housing according to various embodiments of the disclosure. FIG. 1E is a side view illustrating the electronic device in a state where the second housing has been rotated about 270 degrees from the first housing according to various embodiments of the disclosure. FIG. 1F is a side view illustrating the electronic device in a state where the second housing has been rotated about 360 degrees from the first housing according to various embodiments of the disclosure.

Referring to FIG. 1A to FIG. 1F, an electronic device 100 according to various embodiments may include a first housing 110, a second housing 120, and a double-axis hinge housing 130 connecting the first housing 100 and the second housing 120 such that the second housing can rotate from the first housing 110 around a first hinge-axis A1 or a second hinge-axis A2. For example, the electronic device 100 may be configured to be rotatable from 0 degree to 360 degrees, so that the second housing 120 selectively operates from the first housing 110 around the first hinge-axis A1 or the second hinge-axis A2 by a mode switch sliding device (illustrated in FIG. 3) provided in the double-axis hinge housing 130.

The first housing 110 according to various embodiments may include a first upper surface, a first lower surface facing in a direction opposite to the first upper surface, and a first side member surrounding at least a part of the space between the first upper and the lower surface. For example, a keyboard part 112 configured by an arrangement of multiple keys and a touch-pad 114 close to the keyboard part 112 may be arranged on the first upper surface. A not-illustrated battery pack and the like may be arranged on the lower surface of the first housing 110. Multiple ports and the like may be arranged on the first side surface.

The second housing 120 according to various embodiments may include a second upper surface, a second lower surface facing in a direction opposite to the second upper surface, and a second side member surrounding at least a part of the space between the second upper and lower surfaces. For example, a display 122 for example, a touch-screen, may be entirely arranged on the second lower surface. For example, display 122 may be coupled to or arranged close to a touch detection circuit, a pressure sensor capable of measuring the intensity (pressure) of a touch, and/or a digitizer for detecting a magnetic field-type stylus pen.

The double-axis hinge housing (130) may include a double-axis hinge device (illustrated in FIG. 2) described later and the mode switch sliding device (illustrated in FIG. 2) described later. For example, at least a first portion of the double-axis hinge housing 130 may be connected to the first housing 110 to be rotatable around the hinge-axis A1 in a state of being received in a part of the first housing 110, and at least a second part of the double-axis hinge housing 130 may be rotatably connected to the second housing 120 around the hinge-axis A2 parallel to the hinge-axis A1.

Referring to FIG. 1B, the electronic device 100 according to various embodiments may include a sliding knob k which is arranged on the double-axis hinge housing 130. The sliding knob k may be arranged at the center of the first portion of the double-axis hinge housing 130 to be exposed and be movably arranged in an arrow ① direction. Modes of the electronic device 100 may be switched in accordance with a movement of the sliding knob k. For example, when the sliding knob k has been moved to the left, the second housing 120 may rotate around the second hinge-axis A2 within a rotation angle between 0 degree to 180 degrees and around the first hinge-axis A1 within a rotation angle between 180 degrees to 360 degrees.

Meanwhile, when the sliding knob k has been moved to the right, the second housing 120 may rotate around the first hinge-axis A1 within a rotation angle between 0 degree to 180 degrees and around the second hinge-axis A2 within a rotation angle between 180 degrees to 360 degrees.

In the state of the electronic device as in FIG. 1F, in which the second housing 120 has been turned over after being rotated 360 degrees from the first housing 110, the display 122 is arranged at the front thereof, so that the electronic device 100 may be used as a tablet PC.

Figure 2:
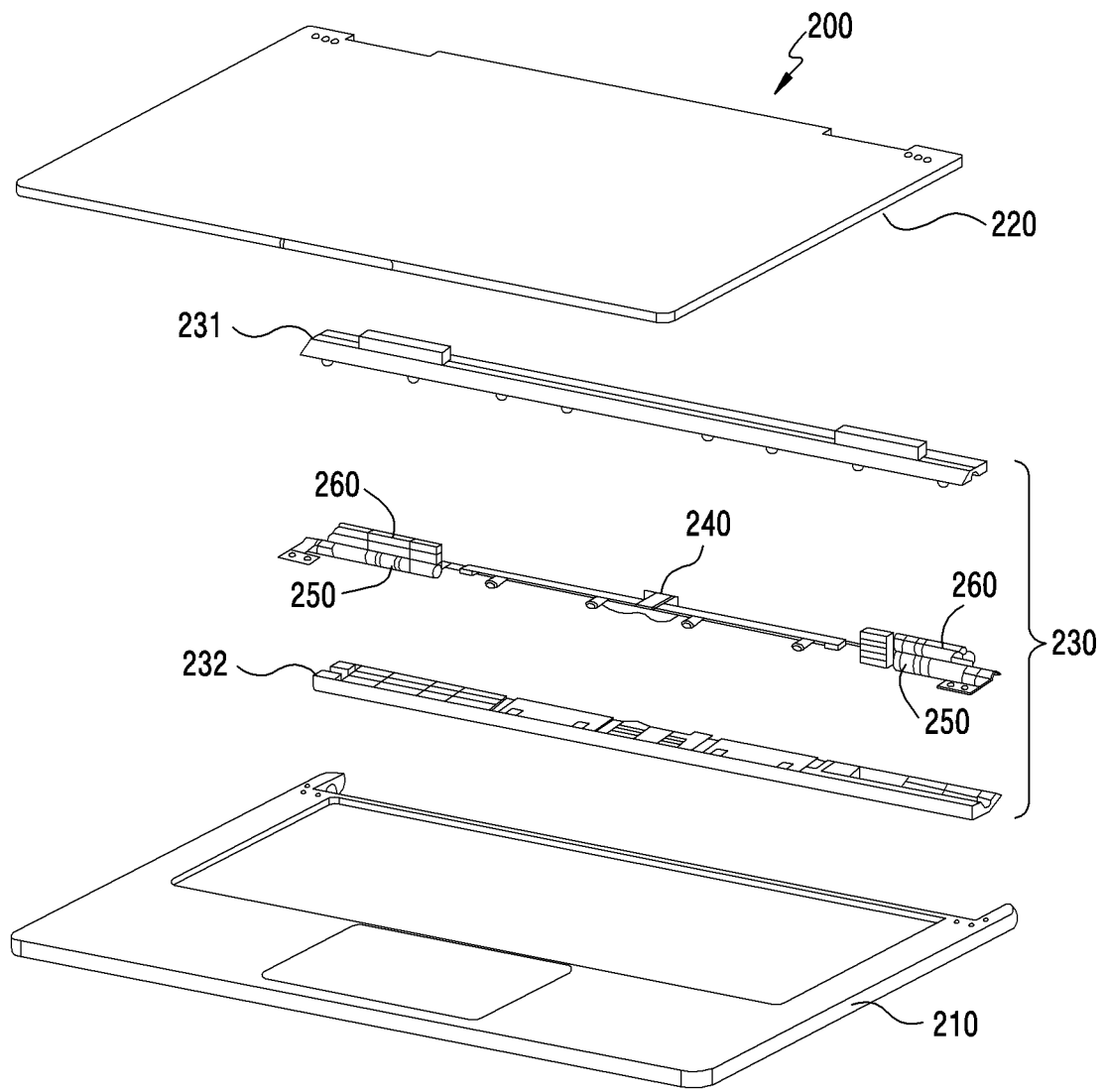
FIG. 2 is a separated perspective view illustrating a double-axis hinge device provided in the electronic device according to various embodiments of the disclosure.

FIG. 2 is a separated perspective view illustrating a double-axis hinge device provided in the electronic device according to various embodiments of the disclosure.

Referring FIG. 2, the electronic device 200 according to various embodiments may be the same electronic device as the electronic device 100 illustrated in FIG. 1A to FIG. 1F. The electronic device 200 according to various embodiments may include the first housing 210, the second housing 220, the double-axis hinge housing 230, the mode switch sliding device 240, and the double-axis hinge devices 250 and 260.

The first housing 210 according to various embodiments may be named as a first body, a first electronic device, or an input device and the second housing 220 may be named as a second body, a second electronic device, a display device, or an input/output device. For example, the first portion of the double-axis hinge housing 230 is rotatably connected to the first housing 210 and a second portion of the double-axis hinge housing 230 is rotatably connected to the second housing 220.

The double-axis hinge housing 230 may receive the mode switch sliding device 240 and the double-axis hinge devices 250 and 260. For example, the double-axis hinge housing 230 may be configured by a combination of an upper hinge housing 231 and a lower hinge housing 232.

The mode switch sliding device 240 according to various embodiments may have both sides connected to the double-axis hinge devices 250 and 260, respectively. The double-axis hinge devices may include first and second fastening parts (illustrated in FIG. 3), respectively, which allow the double-axis hinge devices to be fastened to the first housing 210 and the second housing 220, respectively.

Figure 3A:
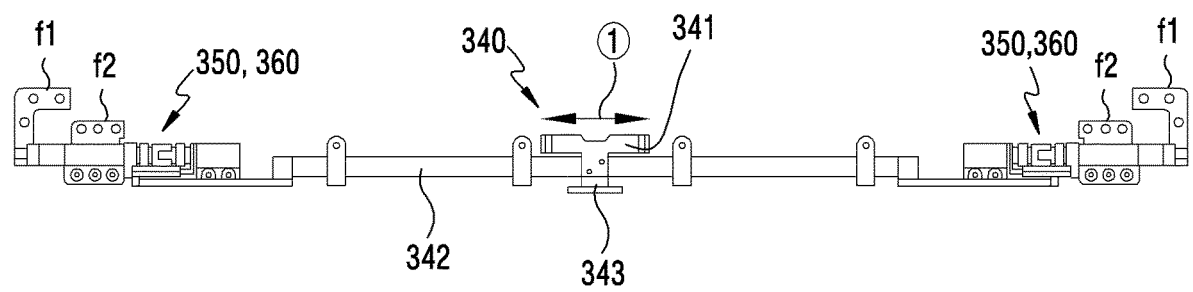
FIG. 3A is a plan view illustrating a connection state between a mode switch sliding device and the double-axis hinge device which are provided in the electronic device according to various embodiments of the disclosure.
Figure 3B:
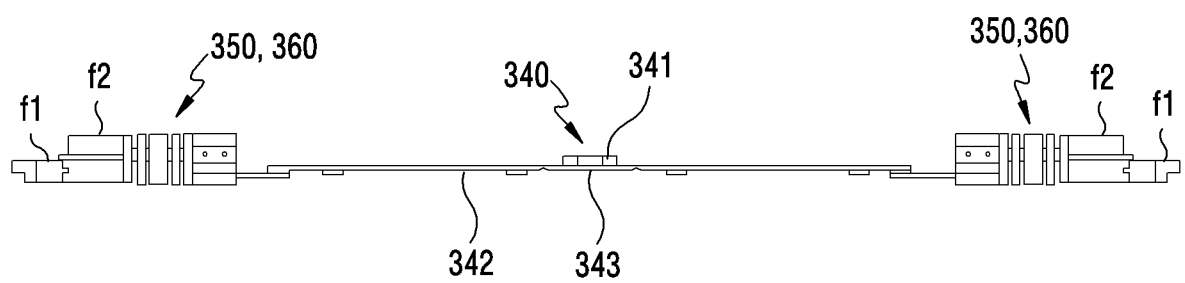
FIG. 3B is a side view illustrating a connection state between the mode switch sliding device and the double-axis hinge device which are provided in the electronic device according to various embodiments of the disclosure.
Figure 3C:
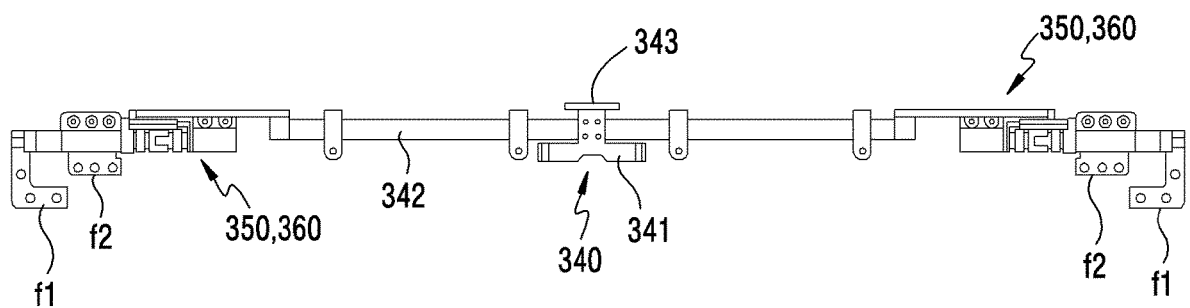
FIG. 3C is a bottom view illustrating a connection state between the mode switch sliding device and the double-axis hinge device which are provided in the electronic device according to various embodiments of the disclosure.

FIG. 3A is a plan view illustrating a connection state between a mode switch sliding device and the double-axis hinge device which are provided in the electronic device according to various embodiments of the disclosure. FIG. 3B is a side view illustrating a connection state between the mode switch sliding device and the double-axis hinge device which are provided in the electronic device according to various embodiments of the disclosure. FIG. 3C is a bottom view illustrating a connection state between the mode switch sliding device and the double-axis hinge device which are provided in the electronic device according to various embodiments of the disclosure.

A mode switch sliding device 340 may be configured identical to the mode switch sliding device 240 illustrated in FIG. 2 and the double-axis hinge devices 350 and 360 may be configured identical to the double-axis hinge devices 250 and 260 illustrated in FIG. 2.

Referring to FIG. 3A to FIG. 3C, the mode switch sliding device 340 may include a sliding knob 341 and a sliding guide connection member 342. The sliding knob 341 is mounted to be exposed outside the double-axis hinge housing and is forcibly moved to one side or the other side by a user, so that modes may be switched. For example, the sliding knob 341 may move in arrow ① direction, that is, to the left or the right. When the sliding knob 341 has moved to the left, a cam described later may be set in a first mode interlocked with the first hinge device 350, and when the sliding knob 341 has been moved to the right, the cam described later may be set in a second mode interlocked with the second hinge device 360.

The sliding knob 341 according to various embodiments may be movably arranged in the double-axis hinge housing by a fastening member 343. In addition, the sliding guide connection member 342 may be connected to each of guides, described later, adjacent to both sides of the sliding knob 341, in a state of being received in the double-axis hinge housing.

As will be described later, in accordance with a movement of the sliding knob 341, the cam (FIG. 4A to FIG. 4D) may be inserted into a cam recess of a first hinge device or may operate while being inserted into a cam recess of a second hinge device. As will be described later, when the cam is set to interlock therewith at a first rotation angle by a first hinge part, the second housing may rotate around the second hinge-axis, when the cam is set to interlock therewith at a second rotation angle by a second hinge part, the second housing may rotate around the first hinge-axis.

Figure 4A:
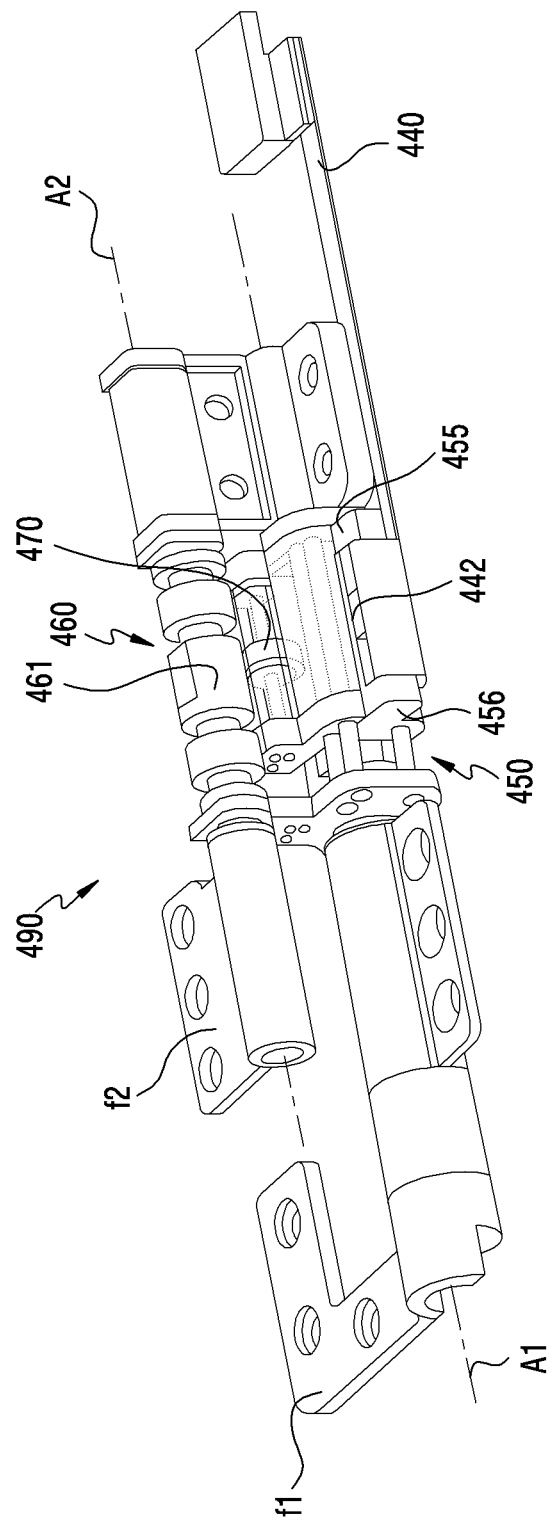
FIG. 4A and FIG. 4B are perspective views illustrating the double-axis hinge devices, respectively, according to various embodiments of the disclosure.
Figure 4B:
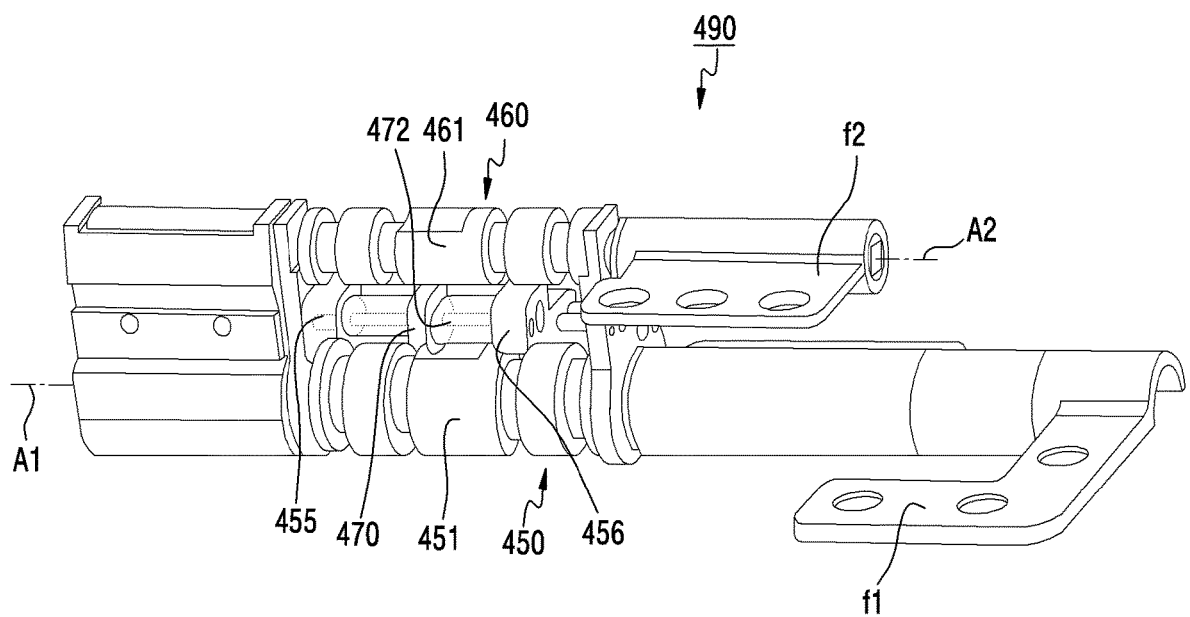
Figure 4C:
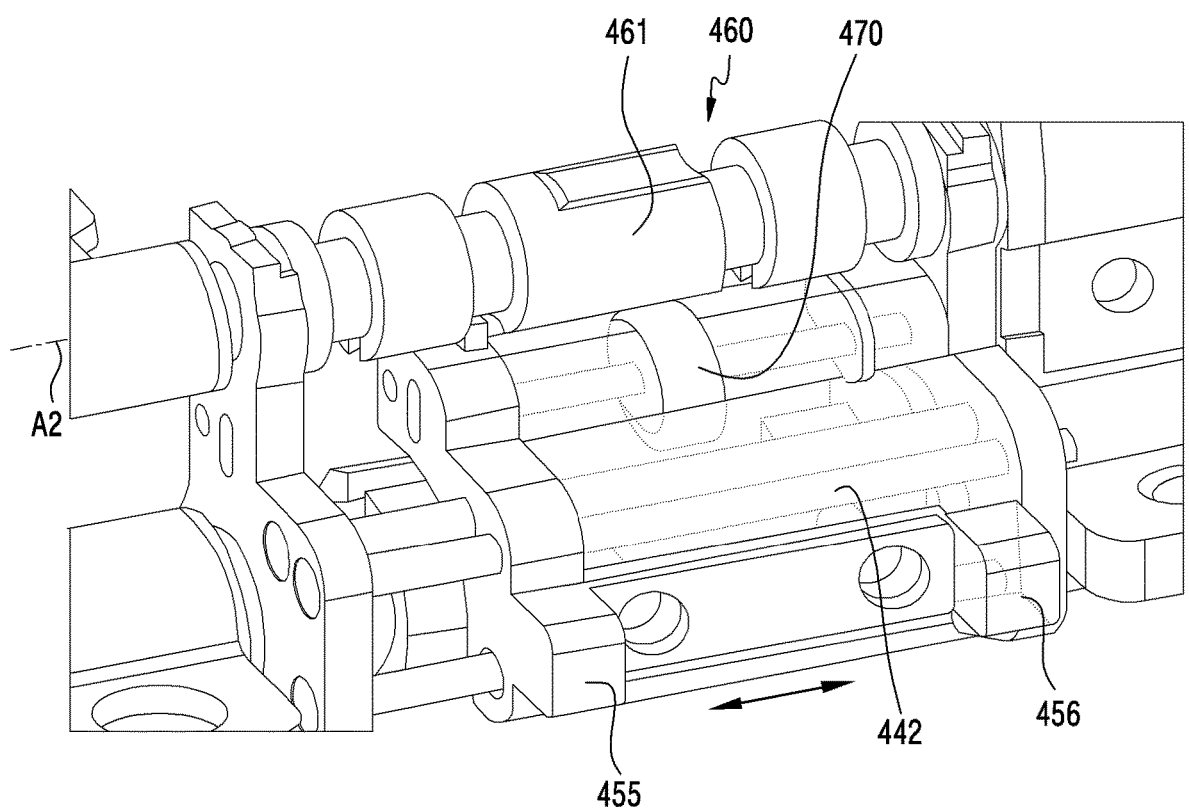
FIG. 4C and FIG. 4D are enlarged perspective views illustrating the double-axis hinge devices, respectively, according to various embodiments of the disclosure.
Figure 4D:
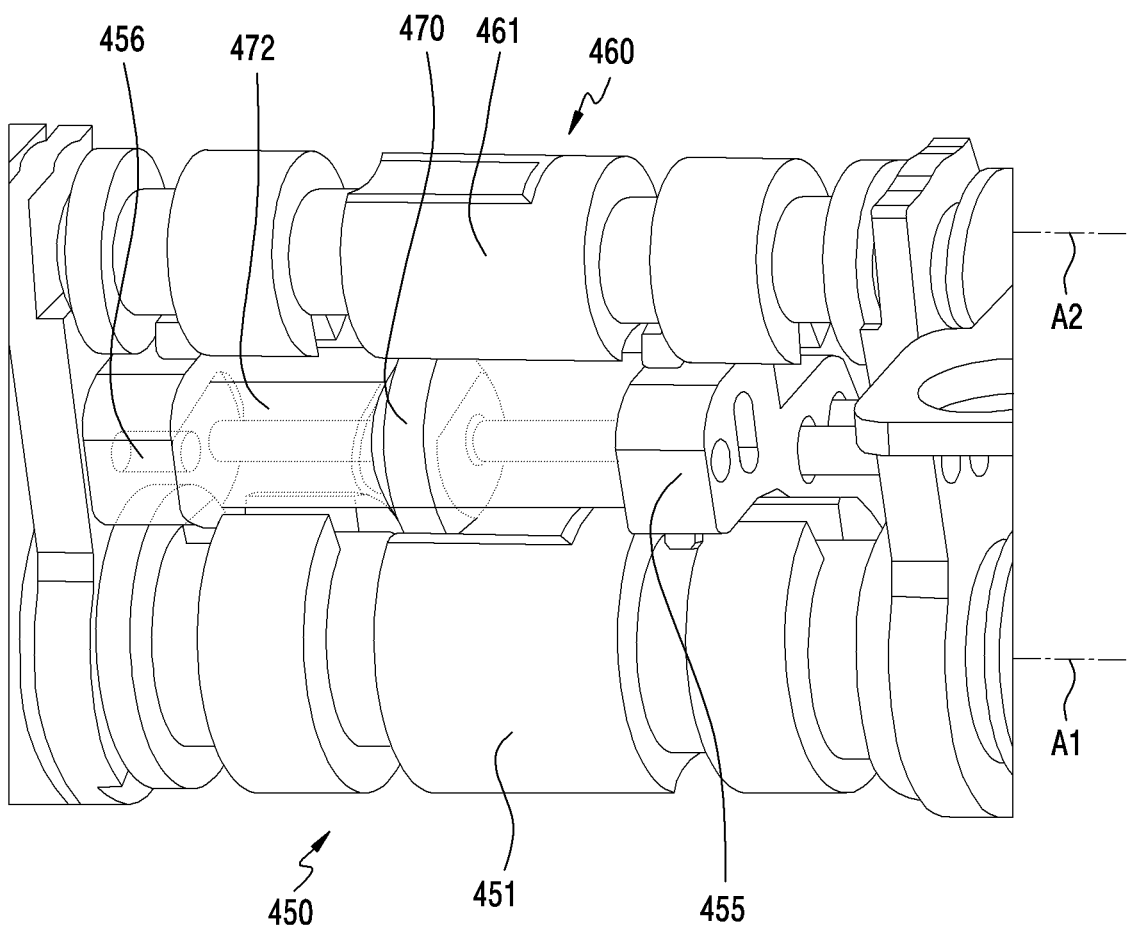

FIG. 4A and FIG. 4B are perspective views illustrating the double-axis hinge devices, respectively, according to various embodiments of the disclosure. FIG. 4C and FIG. 4D are enlarged perspective views illustrating the double-axis hinge devices, respectively, according to various embodiments of the disclosure.

Referring to FIG. 4A to FIG. 4D, the double-axis hinge device 490 according to various embodiments may be configured identical to the double-axis hinge devices 250 and 260; and 350 and 360 illustrated in FIG. 2 and FIG. 3. The double-axis hinge device 490 according to various embodiments may include the first hinge device 450, the second hinge device 460, and the cam 470. For example, the first hinge device 450 may be rotatably connected to the first housing to provide the first hinge-axis A1 and the second hinge device may be rotatably connected to the second housing to provide the second hinge-axis A2. The first hinge device 450 may be mounted parallel to the second hinge device 460.

The cam 470 according to various embodiments may be configured to provide a second rotation shaft for rotating the second housing while being interlocked with the first hinge device 450 or the second hinge device 460, or to provide a first rotation shaft for rotating the first housing while being interlocked with the first hinge device. For example, the cam 470 may have a cylindrical shape.

The cam 470 according to various embodiments may be rotatably configured. The cam 470 may be configured to be rotatable around a third hinge-axis A3 (illustrated in FIG. 6) parallel to the first and the second hinge-axis A1 and A2.

The cam 470 according to various embodiments may be installed between a pair of brackets 455 and 456 to be rotatable around the third hinge-axis A3, and the brackets 455 and 456 may be movably arranged by a guide 422. For example, the guide 442 may be arranged between the pair of brackets 455 and 456 to be movable along a guide shaft.

The cam 470 according to various embodiments may further include at least one auxiliary member 472 placed on coaxially, and a hinge shaft S2 (FIG. 6) providing the third hinge-axis A3 may be arranged to pass through the auxiliary member 472. For example, movement holes (illustrated in FIG. 6) having an elongated length may be provided through the brackets, respectively, such that the cam can rotate around the third hinge-axis. Each of the movement holes may have a curvature. Both ends of a shaft S1 (FIG. 6) of the cam 470 are positioned at the movement holes, respectively, and each of the both ends can move in the inside of the movement holes.

The first hinge device 450 according to various embodiments may include a first cam 451. For example, the first cam 451 may have an approximately cylindrical shape. The second hinge device 460 according to various embodiments may include a second cam 461. For example, the second cam 461 may have an approximately cylindrical shape. The first cam 451 and the second cam 461 may be arranged to face each other such that the cam 470 between the first cam 451 and the second cam 461 can be selectively interlocked with the first cam 451 and the second cam 461 by rotation of the cam 470.

Figure 5A:
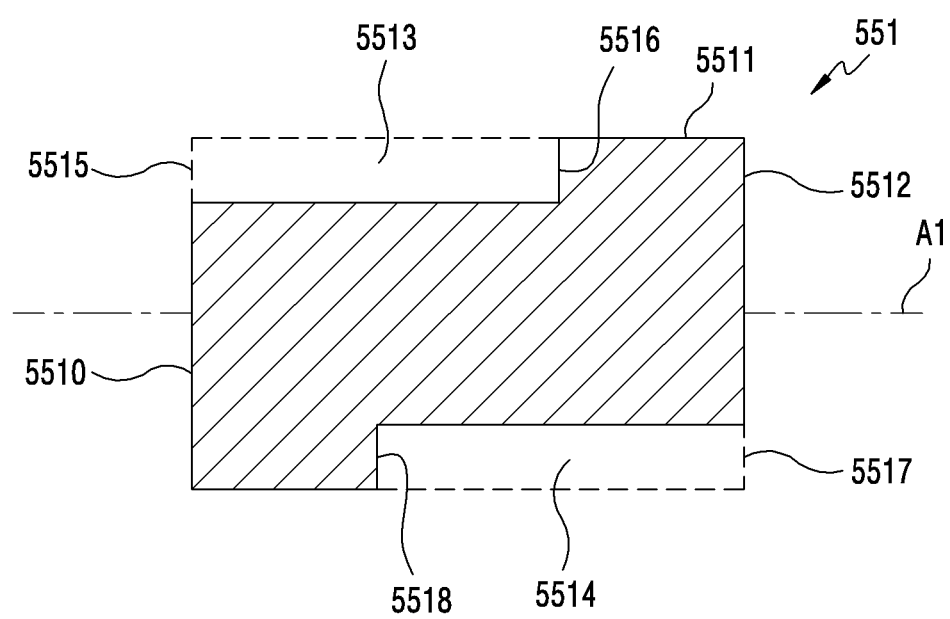
FIG. 5A is a cross-section view illustrating a configuration of a first cam according to various embodiments of the disclosure.

FIG. 5A is a cross-section view illustrating a configuration of a first cam according to various embodiments of the disclosure.

Referring to FIG. 5A, a first cam 551 configuring the first hinge device according to various embodiments may be configured identical to the first cam 451 illustrated in FIG. 4A to FIG. 4D. The first cam 551 according to various embodiments may be formed as a cylindrical shape and include a first one end surface 5510, a first other end surface 5512, and an outer peripheral surface 5511. The first one end surface 5510 may be faced with the first other end surface 5512. The first cam 551 may include a first one side cam recess 5513 and a first other side cam recess 5514. For example, the first one side cam recess 5513 and the first other side cam recess 5514 may include surfaces having a curvature, respectively.

A first one side cam recess 5513 according to various embodiments may be formed on the outer peripheral surface 5511 of the first cam 551 to extend in the direction of the first hinge-axis A1 from the first one end surface 5510.

A first other side cam recess 5514 according to various embodiments may be formed on the outer peripheral surface 5511 of the first cam 551, be formed on a portion which faces the first one side cam recess 5513 from an opposite direction thereof, and extend in the direction of the first hinge-axis A1 from the first other end surface 5512.

The first one side cam recess 5513 according to various embodiments may include a first one side open end 5515 provided at the first one end surface 5510 and a first one side closed end 5615 formed at a portion spaced a first distance from the first one side open end 5615 along the first hinge-axis A1.

The first other side cam recess 5514 according to various embodiments may include a first other side open end 5517 provided at the first other end surface 5512 and a first other side closed end 5518 formed at a portion spaced the first distance from the first other side open end 5517 in the direction of the first hinge-axis A1.

Figure 5B:
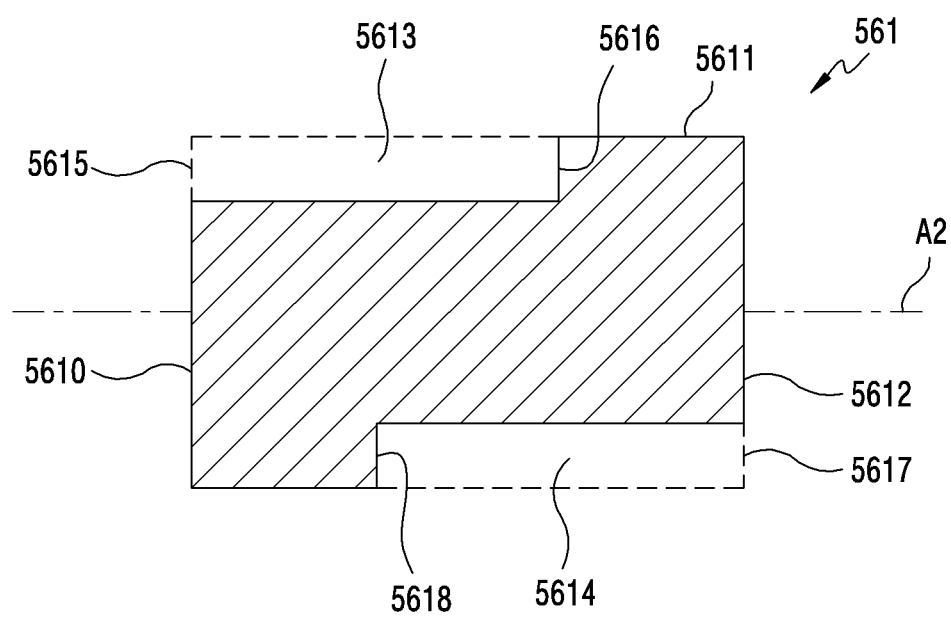
FIG. 5B is a cross-section view illustrating a configuration of a second cam according to various embodiments of the disclosure.

FIG. 5B is a cross-section view illustrating a configuration of a second cam according to various embodiments of the disclosure.

Referring to FIG. 5B, a second cam 561 configuring the second hinge device according to various embodiments may be configured identical to the first cam 451 illustrated in FIG. 4A to FIG. 4D. The second cam according to various embodiments may have a cylindrical shape and include a second one end surface 5610, a second other end surface 5612, and an outer peripheral surface 5611. The second one end surface 5610 may be faced with the second other end surface. The second cam 561 may include a second one side cam recess 5613 and a second other side cam recess 5614. For example, the second one side cam recess 5613 and the second other side cam recess 5614 may include surfaces having a curvature, respectively.

A second one side cam recess 5613 according to various embodiments may be formed on the outer peripheral surface 5611 of the second cam 561 and extend in the direction of the second hinge-axis A2 from the second one end surface 5610.

A second other side cam recess 5614 according to various embodiments may be formed on the outer peripheral surface 5611 of the second cam 561, be formed on a portion, which faces the second one side cam recess 5613 from an opposite direction thereof, and extend in the direction of the second hinge-axis A2 from the second other end surface 5612.

The second one side cam recess 5613 according to various embodiments may include a second one side open end 5615 provided at the second one end surface 5610 and a second one side closed end 5616 formed at a portion spaced a second distance from the second one side open end 5615 along the second hinge-axis A2.

The second other side cam recess 5614 according to various embodiments may include a second other side open end 5617 provided at the second other end surface 5612 and a second other side closed end 5618 formed at a portion spaced the second distance from the second other side open end 5617 in the direction of the second hinge-axis A2.

When a portion of the cam is coupled to the first cam 551 or the second cam 561 configured as described above, a rotation operation of the first housing or the second housing may be selective by a structure of a combination between the cam recess of the first cam 551 and the cam or a combination between the cam recess of the second cam and the cam.

Figure 6:
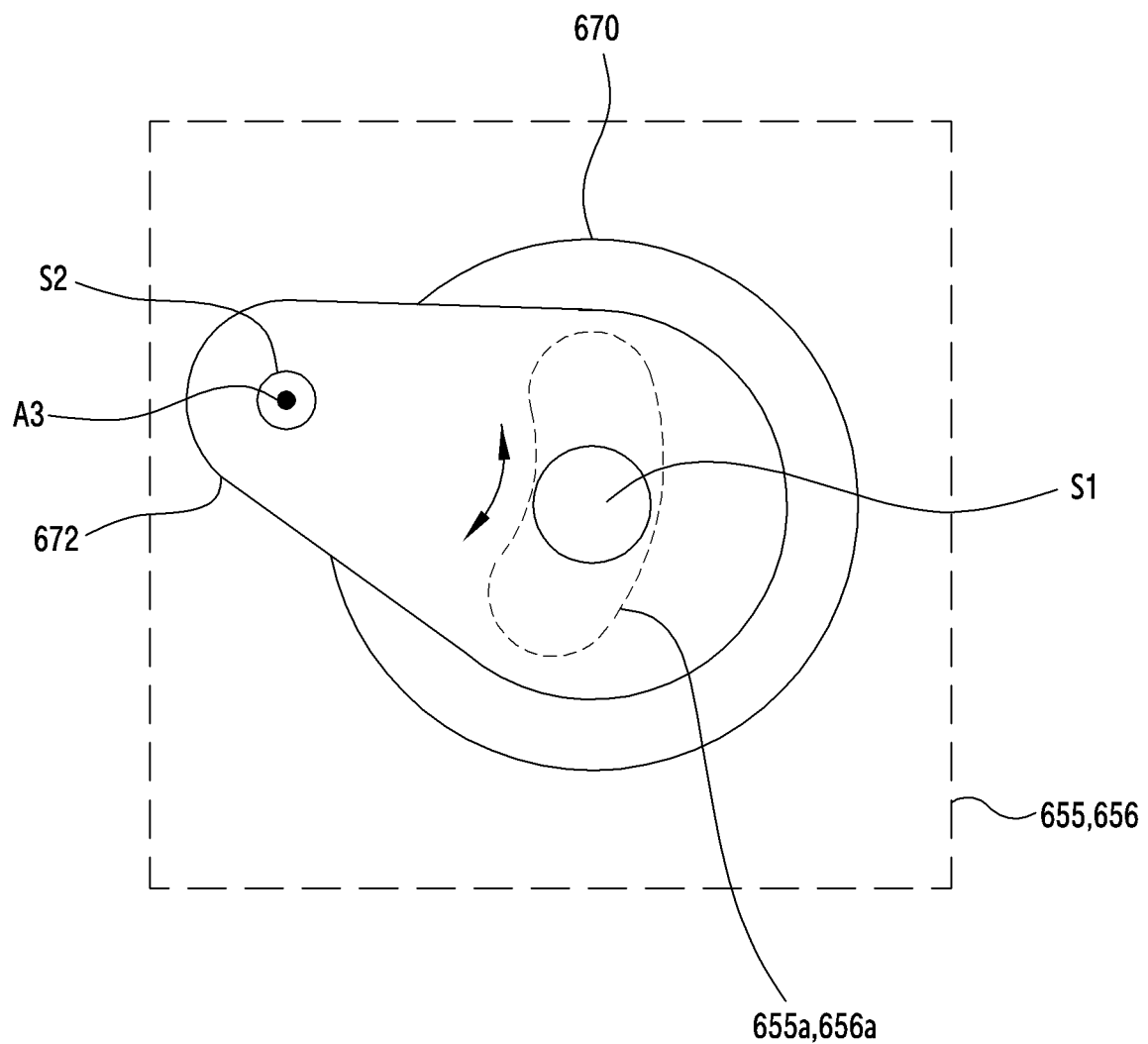
FIG. 6 is a side view illustrating a mounted state of a cam according to various embodiments of the disclosure.

FIG. 6 is a side view illustrating a mounted state of a cam according to various embodiments of the disclosure.

Referring to FIG. 6, the cam according to various embodiments may be configured identical to the cam 470 illustrated in FIG. 4A to FIG. 4D. The cam 670 according to various embodiments may be mounted to be rotatable around the third hinge-axis A3. The cam 670 may be arranged between the first and the second hinge device and can rotate so as to interlock with the first hinge device or the second hinge device. To this end, the shaft S1 provided at the auxiliary member 672 coaxially mounted with the cam 670 may be move in the movement holes 655a and 656a formed through the brackets 655 and 656. The movement holes 655a and 656a may serve as a guide hole for allowing a limited movement of the shaft S1 and have a curvature. A hinge shaft S2 providing the third hinge-axis A3 of the auxiliary member 672 may be inserted into mounting holes formed through the brackets 655 and 656, so that the cam 670 can rotate around the third hinge-axis A3 at the brackets.

The auxiliary member 672 according to various embodiments may be coaxially mounted with the shaft S1 of the cam and rotate around the third hinge-axis A3, so that other side portion of the auxiliary member 672 can move to upward side (the first cam side) or to downward side (the second cam side) within a limited angle.

Hereinafter, the operation of the double-axis hinge device in accordance with the opening/closing operation of the electronic device according to various embodiments will be described with reference to the accompanying drawings.

Figure 7A:
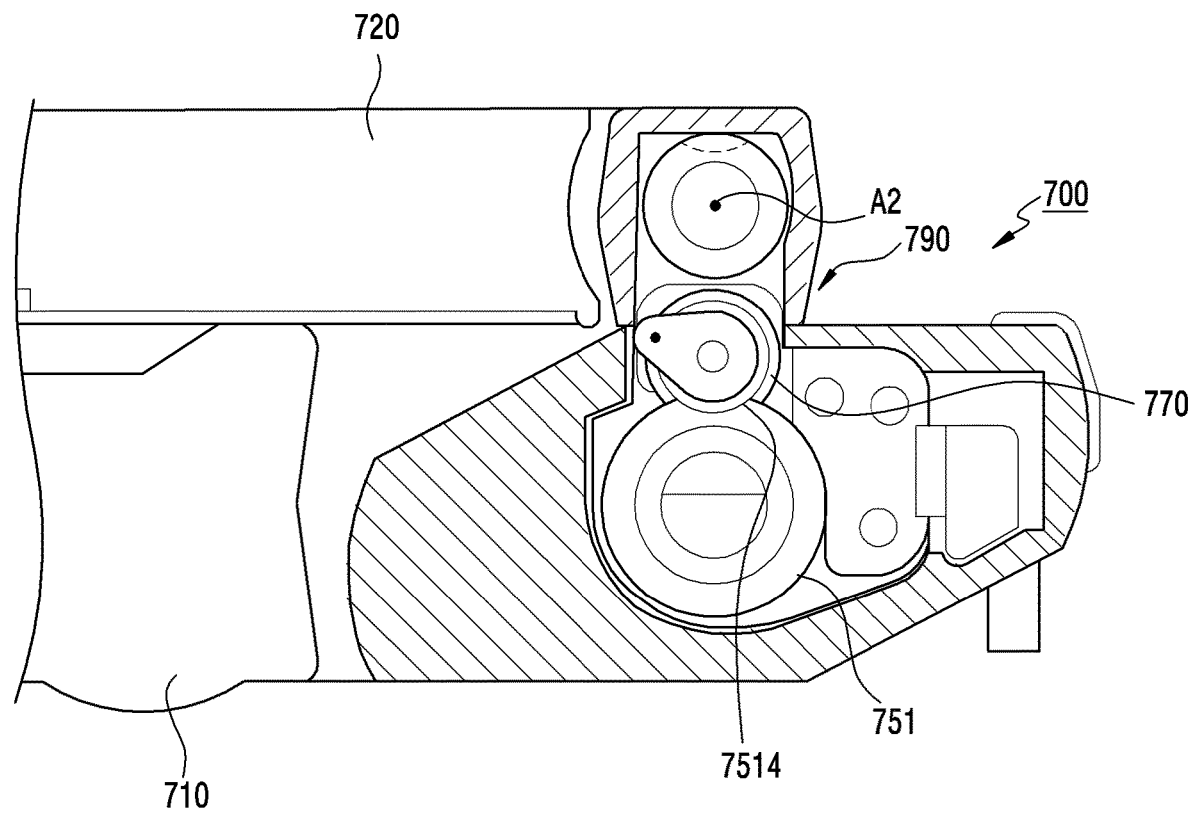
FIG. 7A is a cross-section view illustrating the double-axis hinge device in a closed state according to various embodiments of the disclosure.

FIG. 7A is a cross-section view illustrating the double-axis hinge device in a closed state according to various embodiments of the disclosure. FIG. 7A is a cross-section view illustrating the double-axis hinge device of the electronic device (in a closed state) illustrated in FIG. 1A.

Referring to FIG. 7A, according to the electronic device 700 according to various embodiments, when the second housing 720 is closed on the first housing 710, the cam 770 of the double-axis hinge device 790 is inserted into the first cam recess 7514 of the first cam 751 (a coupled state or a set state). Due to the insertion structure described above, the second housing 720 cannot rotate around the first hinge-axis A1 and can rotate around the second hinge-axis A2.

Figure 7B:
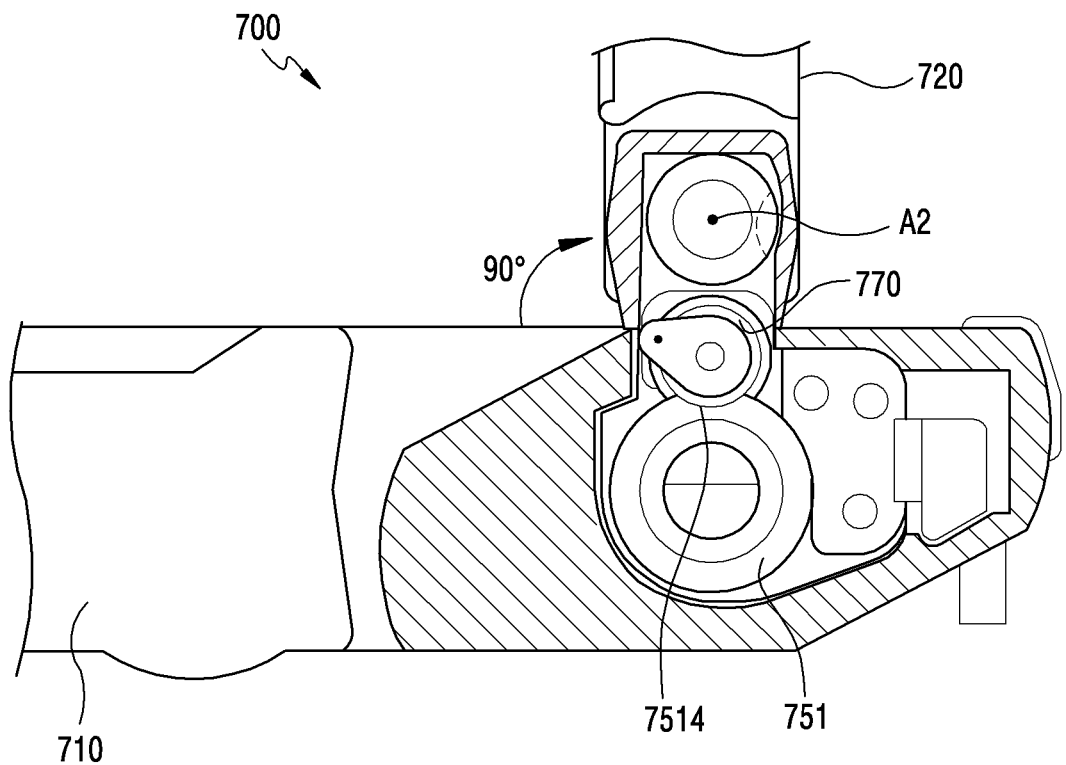
FIG. 7B is a cross-section view illustrating the double-axis hinge device in a state, in which the second housing has been rotated about 90 degrees from the first housing according to various embodiments of the disclosure.

FIG. 7B is a cross-section view illustrating the double-axis hinge device in a state, in which the second housing 720 has been rotated about 90 degrees from the first housing 710 according to various embodiments of the disclosure. FIG. 7B is a cross-section view illustrating a state of the double-axis hinge device of the electronic device (the state where the second housing has been rotated about 90 degrees in a clockwise direction) illustrated in FIG. 1C.

Referring to FIG. 7B, according to the electronic device 700 according to various embodiments, when the second housing 720 has been rotated about 90 degrees in the clockwise direction around the second hinge-axis on the first housing 710, the cam 770 is inserted into the first cam recess 7514 of the first cam 751 (the coupled state). Due to the insertion structure described above, the second housing 720 can rotate around the second hinge-axis A2.

Figure 7C:
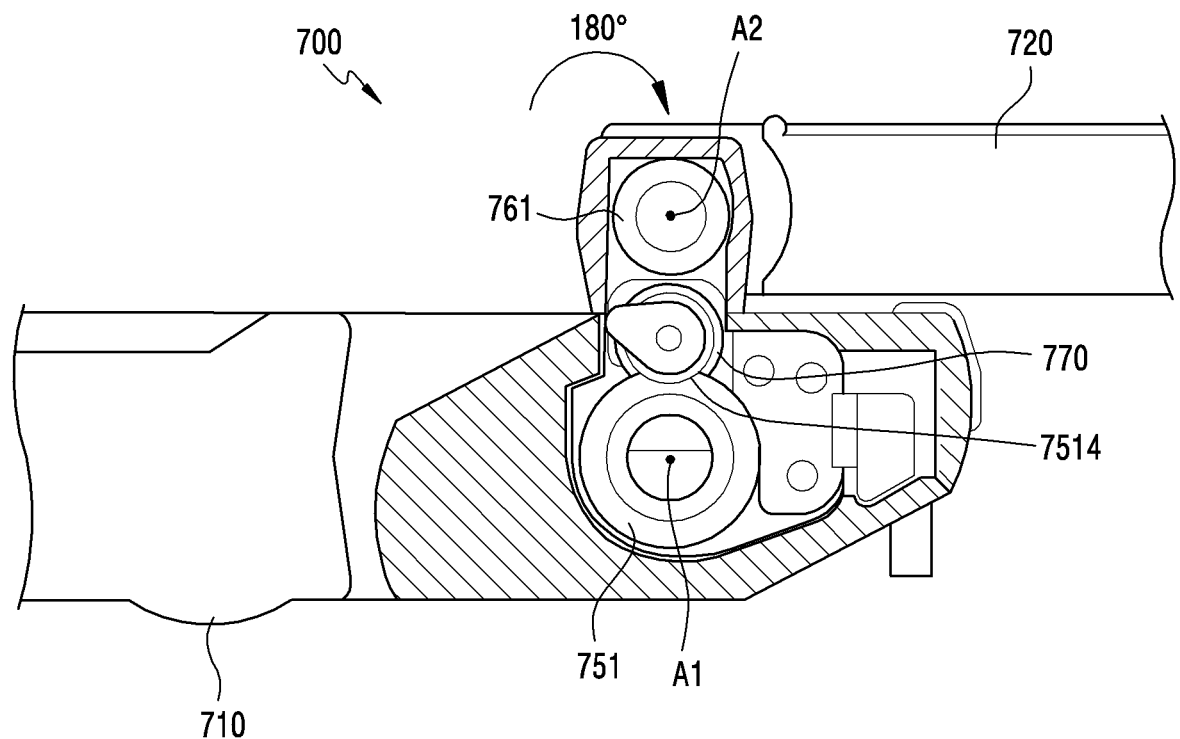
FIG. 7C is a cross-section view illustrating the double-axis hinge device of a state, in which the second housing has been rotated about 180 degrees from the first housing according to various embodiments of the disclosure.
Figure 7D:
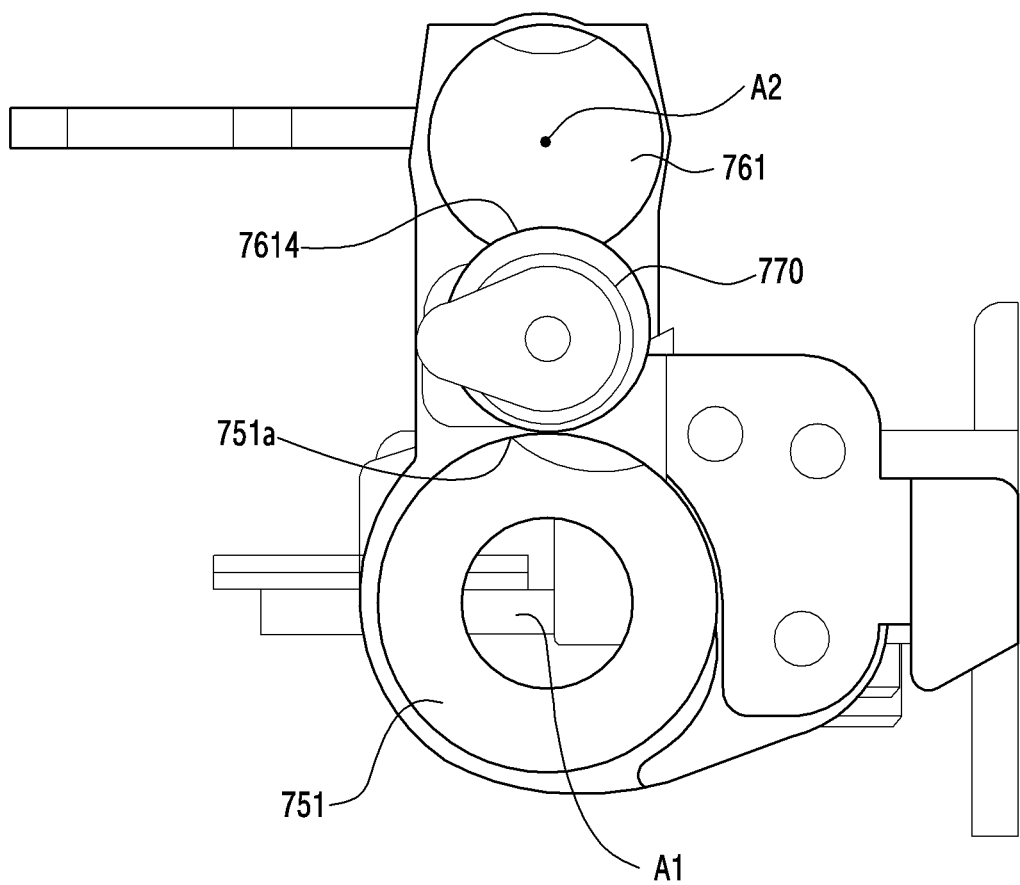
FIG. 7D is a cross-section view illustrating a state, in which the first cam pushes up the cam toward the second cam according to various embodiments of the disclosure.

FIG. 7C is a cross-section view illustrating the double-axis hinge device in a state, in which the second housing has been rotated about 180 degrees from the first housing according to various embodiments of the disclosure. FIG. 7D is a cross-section view illustrating the double-axis hinge device in a state, in which the cam has been rotated after the second housing is rotated about 180 degrees from the first housing according to various embodiments of the disclosure.

Figure 7E:
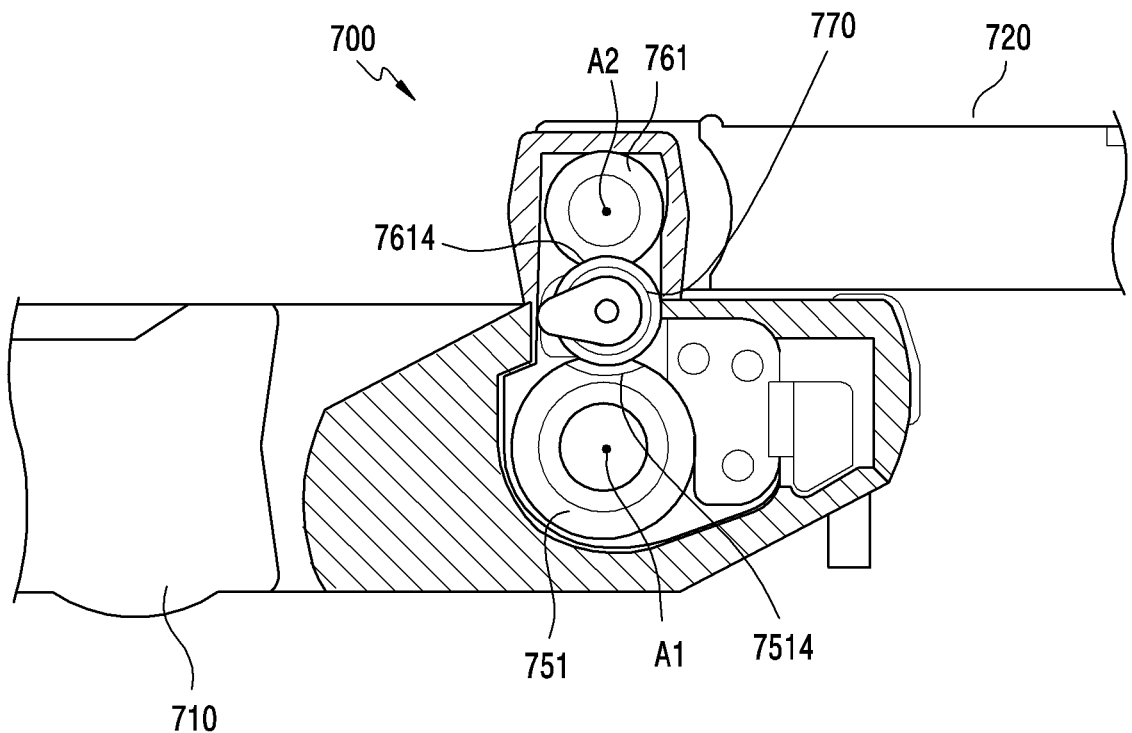
FIG. 7E is a cross-section view illustrating the double-axis hinge device in a state, in which the cam has been rotated after the second housing is rotated about 180 degrees from the first housing according to various embodiments of the disclosure.

FIG. 7C to FIG. 7E are a cross-section views illustrating a state of the double-axis hinge device of the electronic device (the state where the second housing has been rotated about 90 degrees) illustrated in FIG. 1D.

Referring to FIG. 7C, according to the electronic device 700 according to various embodiments, when the second housing 720 has been rotated about 180 degrees in the clockwise direction around the second hinge-axis on the first housing 710, the cam 770 is inserted into the first cam recess 7514 of the first cam 751 (the coupled state). However, the second housing 720 can more rotate around the second hinge-axis A2 due to the above mechanical structure. On the other hand, the cam 770 rotates in the counterclockwise direction and thus can be inserted into the cam recess of the second cam 761 after being separated from the first cam recess 7514 of the first cam 751. Due to the insertion structure described above, the second housing 720 can rotate around the first hinge-axis A1. When the second housing 720 rotates more than 180 degrees, a portion 751a (illustrated in FIG. 7D) of the first cam 751 pushes up the cam 770 toward the second cam 761, so that the cam 770 moves into the cam recess 7614 of the second cam 761.

On the other hand, the cam 770 is inserted into the cam recess of the second cam 761, so that the second housing 720 cannot rotate around the second hinge-axis A2 due to the insertion structure described above.

Figure 7F:
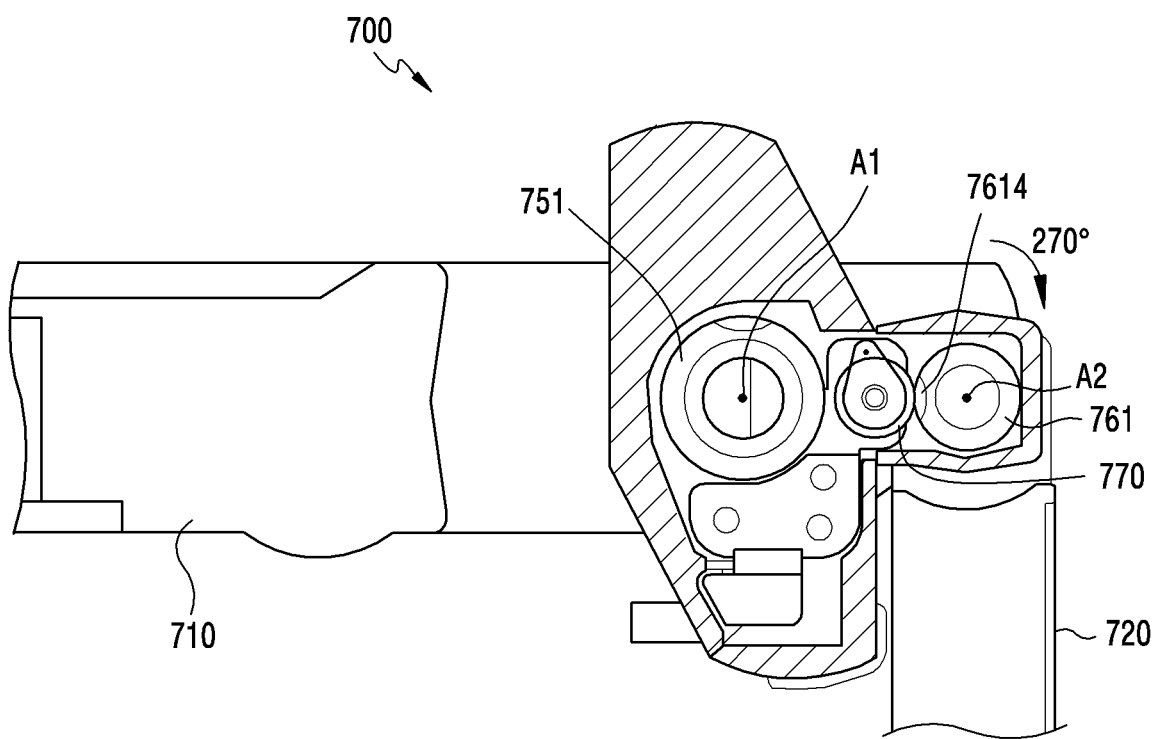
FIG. 7F is a cross-section view illustrating the double-axis hinge device in a state, in which the second housing has been rotated about 270 degrees from the first housing according to various embodiments of the disclosure.

FIG. 7F is a cross-section view illustrating the double-axis hinge device in a state, in which the second housing has been rotated about 270 degrees from the first housing according to various embodiments of the disclosure. FIG. 7F is a cross-section view illustrating a state of the double-axis hinge device of the electronic device (the state where a second housing has been rotated about 270 degrees from a first housing) illustrated in FIG. 1E.

Referring to FIG. 7F, according to the electronic device 700 according to various embodiments, when the second housing 720 has been rotated about 270 degrees in the clockwise direction around the first hinge-axis on the first housing 710, the cam 770 is inserted into the first cam recess 7614 of the second hinge cam 761 (a locked state or a set state). Due to the insertion structure described above, the second housing 720 can rotate around the second hinge-axis A2.

Figure 7G:
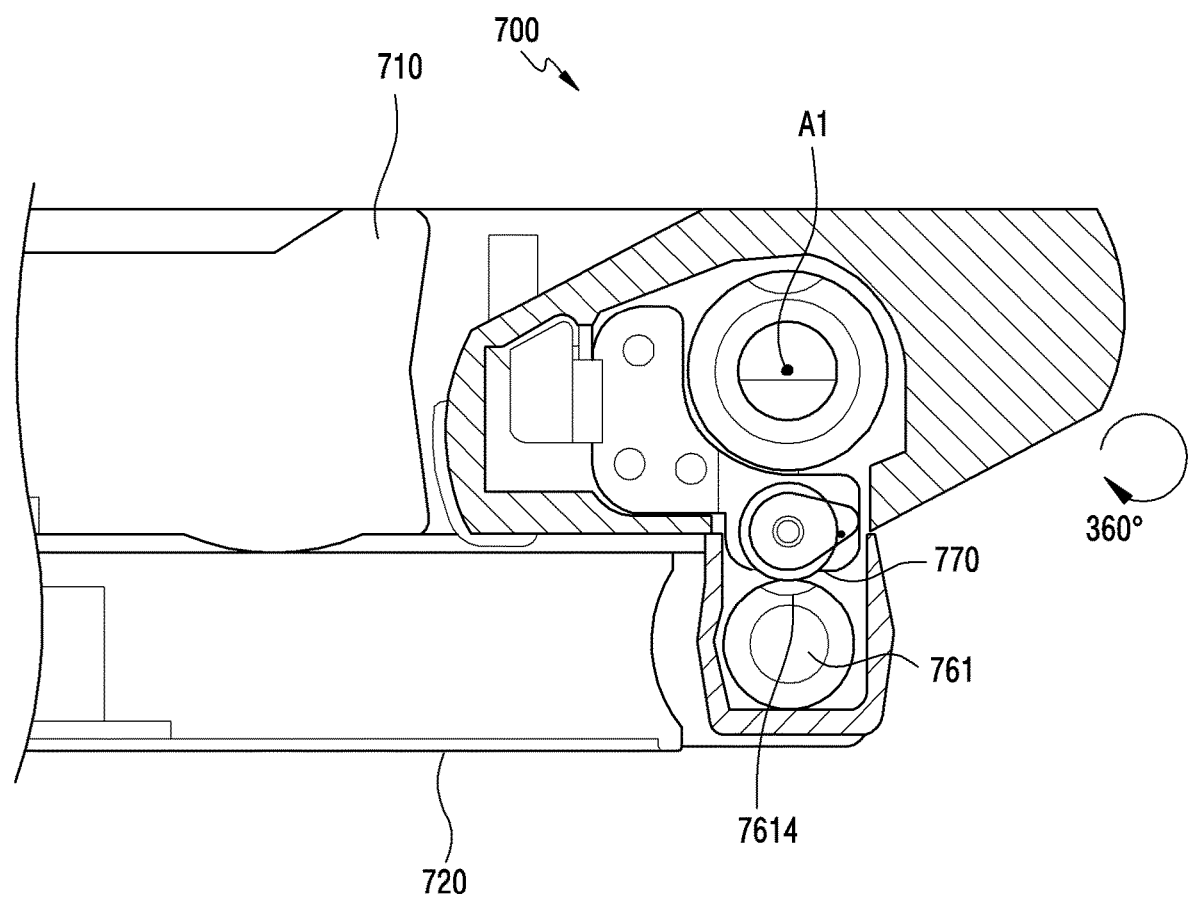
FIG. 7G is a cross-section view illustrating the double-axis hinge device in a state, in which the second housing has been rotated about 360 degrees from the first housing according to various embodiments of the disclosure.

FIG. 7G is a cross-section view illustrating the double-axis hinge device in a state, in which the second housing has been rotated about 360 degrees from the first housing according to various embodiments of the disclosure. FIG. 7G is a cross-section view illustrating a state of the double-axis hinge device of the electronic device (the state where a second housing has been rotated about 360 degrees from a first housing) illustrated in FIG. 1F.

Referring FIG. 7G, according to the electronic device 700 according to various embodiments, when the electronic device 700 has turned over after the second housing 720 is rotated about 360 degrees so that the second housing 720 positions under the first housing 710, the display provided on the second housing 720 faces towards the user, so that the electronic device can be used as the tablet PC mode. In the above described state, the cam 770 is inserted into the cam recess 7614 of the second cam 761, so that the second housing 720 can rotate around the first hinge-axis A1 in the reverse direction thereof.

In the electronic device 700 according to various embodiments, when the mode switch sliding device is operated, that is, the sliding knob is moved in the opposite direction thereof, the second housing 720 rotates around the first hinge-axis A1 within the rotation angle between 0 degree to 180 degrees and the second housing 720 can rotate around the second hinge-axis A2 within the rotation angle between 180 degrees to 360 degrees.

In the electronic device 700 according to various embodiments, when the double-axis hinge housing is placed almost upright on a table, the double-axis hinge housing 720 may serve as a support for the second housing 720 and thus the electronic device is conveniently used in a typing mode.

Hereinafter, a configuration in which the double-axis hinge device is not provided with the mode switch sliding device will be described with reference to the accompanying drawings.

Figure 8A:
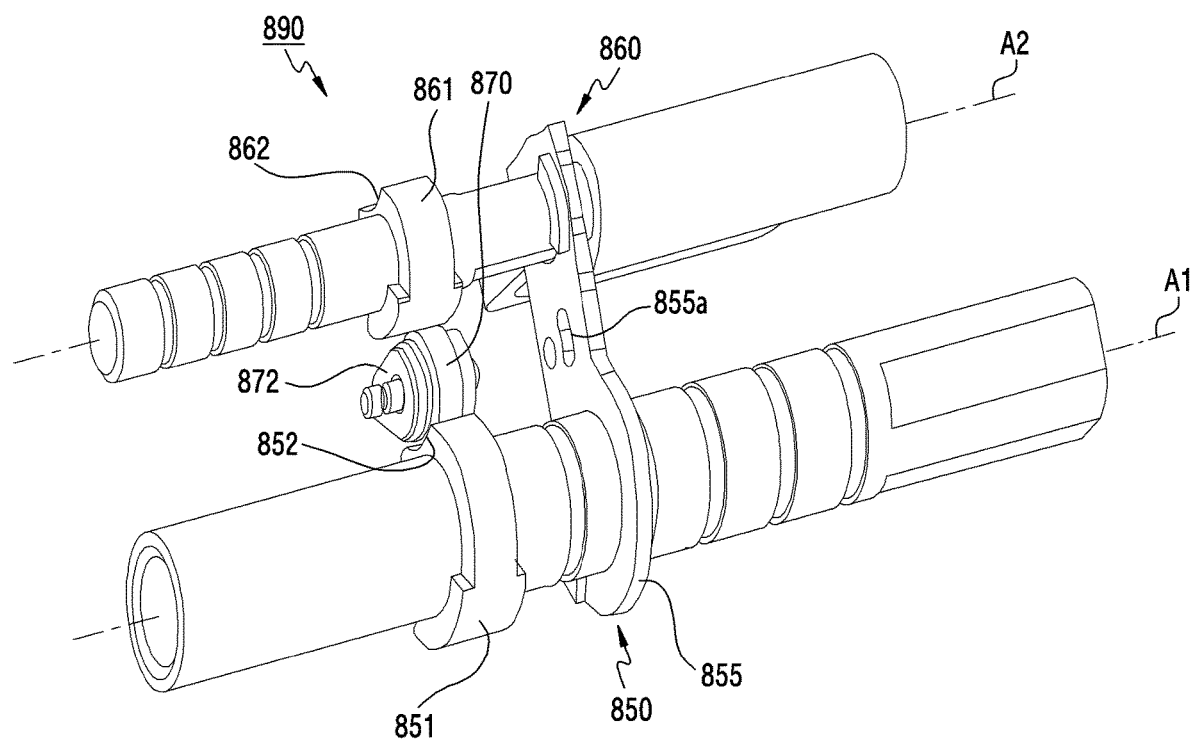
FIG. 8A to FIG. 8C are perspective views illustrating the double-axis hinge devices provided in the electronic devices according to various embodiments of the disclosure, respectively, which are views illustrating the double-axis hinge devices provided with no mode switch sliding devices, respectively.
Figure 8B:
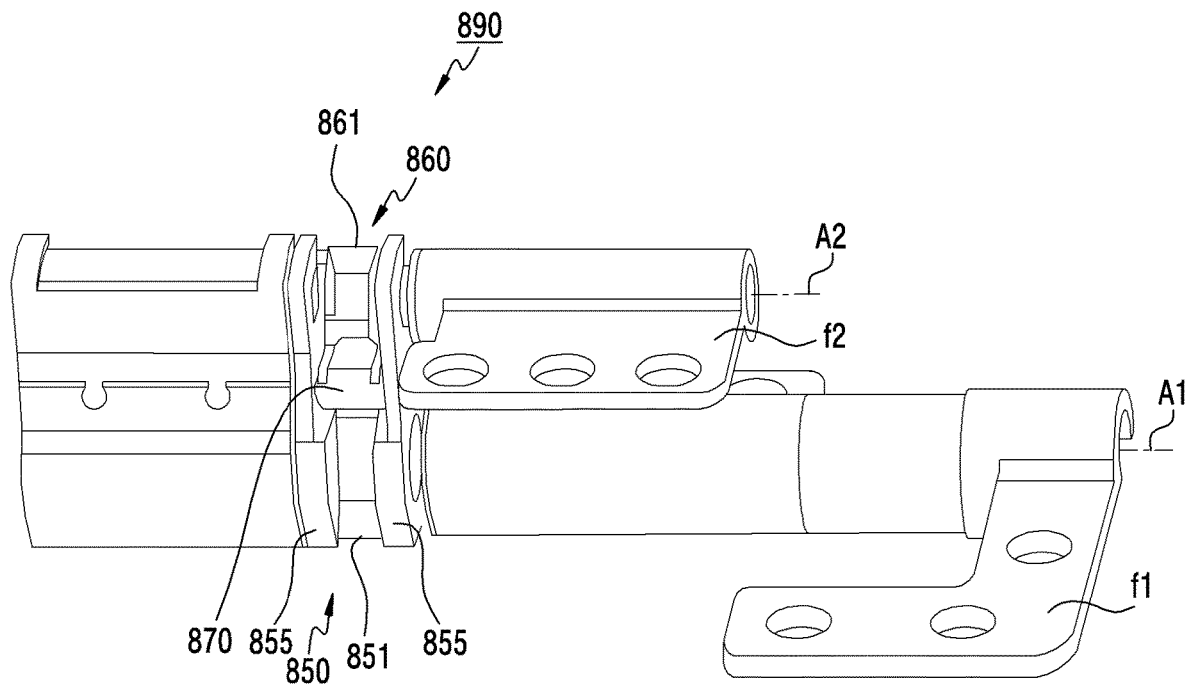
Figure 8C:
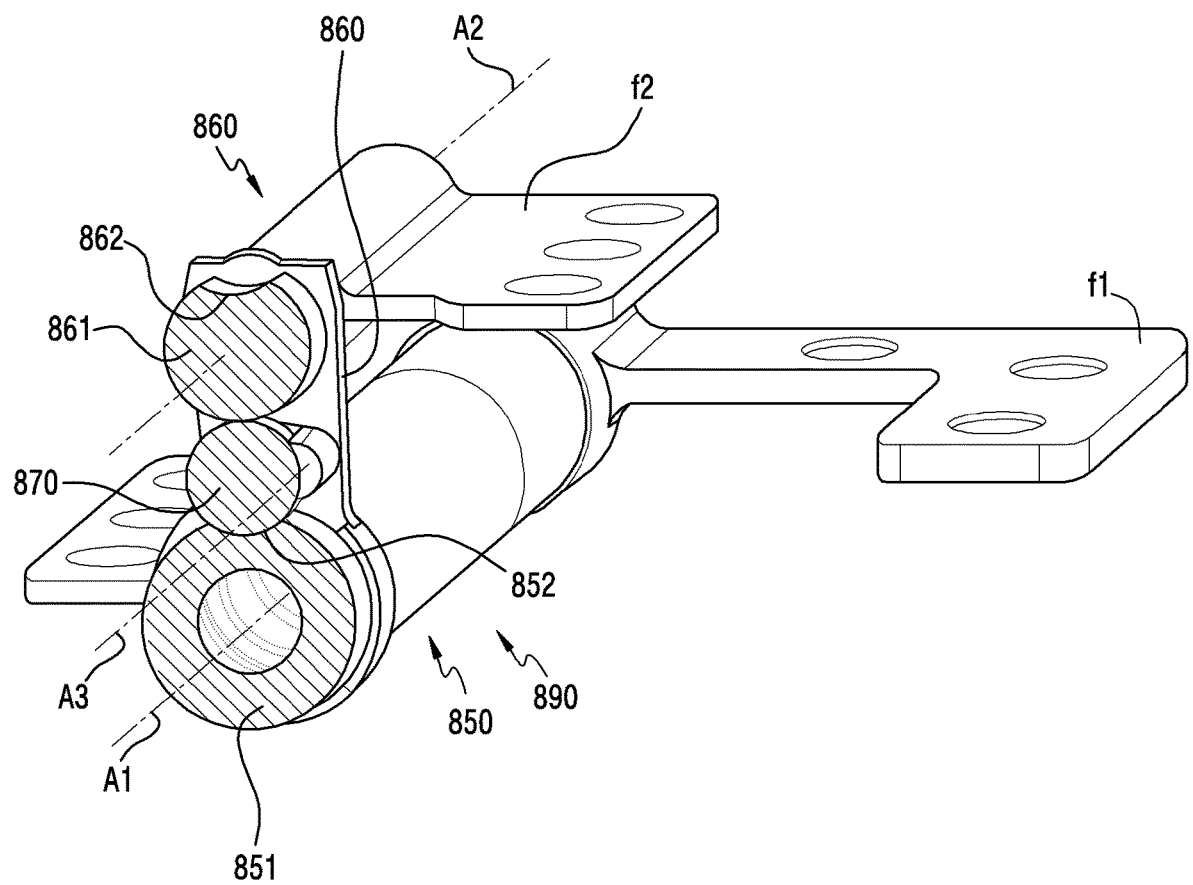

FIG. 8A to FIG. 8C are perspective views illustrating the double-axis hinge devices 890 provided in the electronic devices according to various embodiments of the disclosure, respectively, which are views illustrating the double-axis hinge devices provided with no mode switch sliding devices, respectively.

Referring to FIG. 8A to FIG. 8C, in comparison with the mode switch sliding device 490 illustrated in FIG. 4A to FIG. 4D, the double-axis hinge device 890 according to various embodiments may be a configuration in which the cam does not move due to being provided with no a mode switch sliding device. Accordingly, in comparison with the mode switch sliding device 490 illustrated in FIG. 4A to FIG. 4D, the double-axis hinge device 890 according to various embodiments may be configured such that the structures of the first and the second cam differ from that of the mode switch sliding device 490.

The double-axis hinge device 890 according to various embodiments may perform the operations illustrated in FIG. 7A to FIG. 7F, and the electronic device having the double-axis hinge device 890 may perform the operations illustrated in FIG. 1A to FIG. 1F.

The double-axis hinge device 890 according to various embodiments may include a first hinge device 850, a second hinge device 860, and a cam 870. For example, the first hinge device 850 may provide the first hinge-axis A1, the second hinge device 860 may provide the second hinge-axis A2, and the cam 870 may be selectively interlocked with the first hinge device 850 or the second hinge device 860. The cam 870 may be configured to be rotatable around the third hinge-axis A3 parallel to each of the first and the second hinge-axes A1 and A2. The hinge shaft, which provides the third hinge-axis A3, of the cam 870 may move restrictively within an elongated hole 855a of a support body 855.

The first hinge device 850 according to various embodiments may include the first cam 851. The first cam 851 can rotate around the first hinge-axis A1. The first cam 851 may provide with the first cam recess 852. A portion of the cam 870 may be inserted (coupled or set) into the first cam recess 852.

The second hinge device 860 according to various embodiments may include the second cam 861. The second cam 861 can rotate around the second hinge-axis A2. The second cam 861 may provide with the second cam recess 862. A portion of the cam 870 may be inserted into the second cam recess 862.

In accordance with the cam 870 being inserted (coupled or set) into the first cam recess 852 or the second cam recess 862 or being separated therefrom, the first hinge device 850 may provide the first hinge-axis A1 or the second hinge device 860 may provide the second hinge-axis A2. When the first hinge device 850 operates according to the rotation operation the cam 870, the second hinge device 860 may be in the locked state. On the contrary, when the second hinge device 860 operates, the first hinge device 850 may be in the locked state.

Reference numeral f1 may be a first fastening part for fixing the first hinge device 850 to the first housing, and reference numeral f2 may be a second fastening part for fixing the second hinge device 860 to the second housing.

Figure 9:
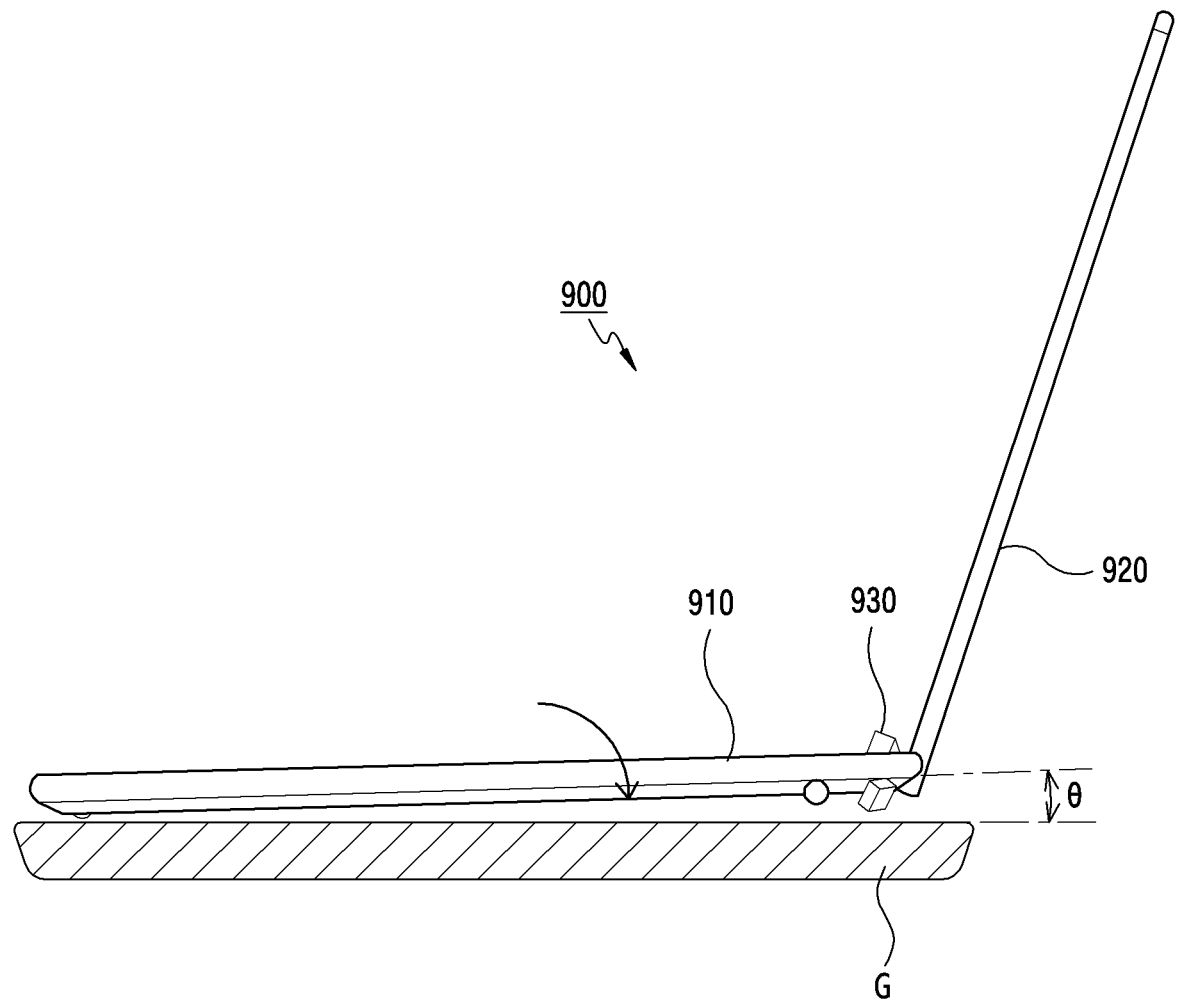
FIG. 9 is a side view illustrating the electronic device of a typing mode according to an embodiment of the disclosure, which is a view illustrating a state, in which the double-axis hinge device is used as a support.

Referring to FIG. 9, according to the electronic device 900 according to various embodiments, the double-axis hinge housing 930 having the first and the second hinge device received therein may serve as a support part. Hereinafter, the double-axis hinge housing 930 will be named as the support part.

For example, when the second housing 920 is opened about 100 degrees to 120 degrees from the first housing 910, the support part 930 may become an opened state in which the support part 930 rotates about 100 degrees to 120 degrees with reference to the ground G. Meanwhile, the first housing 910 may be arranged in a rotated and inclined state with respect to the ground G by a first angle Θ. For example, the first housing may rotate plus-or-minus 15 degrees.

The state as in FIG. 9 may be named as the typing mode of the electronic device 900. The first housing 910 is a slightly inclined state and thus a user's data input motion can be conveniently performed by using an input device arranged on the upper surface of the first housing 910.

According to the state of the above-described electronic device 900, the support part 930 may rotate together with the second housing 920 within 0 degree to 180 degrees, so that the arrangement can be possible.

As used herein, the term "module" may mean a unit including hardware, software, firmware, or a combination of at least two of them, and may be interchangeably used with other terms, for example, "logic," "logic block," "component," or "circuit". The "module" may be a minimum unit of a single integrated component adapted to perform one or more functions, or a part thereof. The "module" may be mechanically or electronically implemented. For example, according to an embodiment, the "module" may be implemented in the form of an application-specific integrated circuit (ASIC). For example, the "module" may include at least one of an application-specific integrated circuit (ASIC) chip, field-programmable gate arrays (FPGAs), and a programmable logic device for performing known operations or operations to be developed in the future.

Devices (e.g., modules or functions thereof) and methods (e.g., operations) according to various embodiments may be implemented as instructions that are stored in the form of a program module in a computer-readable storage medium. The instructions, when executed by a processor (e.g., processor 210), may cause the processor to perform one or more functions corresponding to the instructions. The computer-readable storage medium may be, for example, the memory 220. At least a part of the program module may, for example, be implemented (e.g., executed) by a processor. For example, at least a part of the program module may include a module, a program, a routine, sets of instructions, or processor for one or more functions.

The computer-readable storage medium may include a hard disc, a floppy disc, a magnetic medium (e.g., magnetic tape), an optical medium (e.g., compact disc read only memory (CD-ROM), digital versatile disc (DVD)), a magneto-optical medium (e.g., floptical disk), a hardware device (e.g., read only memory (ROM), random access memory (RAM), or flash memory), and the like. The program instructions may include machine language codes generated by a complier or computer-executable higher-level language codes that can be executed using an interpreter or the like. The hardware device may be configured to operate as one or more software modules for operations according to various embodiments, and vice versa.

A module or a program according to the disclosure may include at least one of the above-described elements, exclude some of them, or further include additional other elements. Operations performed by the module, the program module, or another element may be carried out sequentially, in parallel, repeatedly, or heuristically. Further, one or more of the operations may be executed in a different order or omitted, or one or more other operations may be added.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the disclosure.

The invention claimed is:
1. An electronic device comprising:
a first housing;
a second housing; and
a double-axis hinge housing connecting the first housing and the second housing such that the second housing can rotate from the first housing around a first hinge-axis or a second hinge-axis parallel to the first hinge-axis,
wherein the double-axis hinge housing comprises:
a first hinge device which rotatably connects the first housing and the double-axis hinge housing with reference to the first hinge-axis;
a cam, which receives a double-axis hinge device including a second hinge device parallel to the first hinge device and rotatably connecting the second housing and the double-axis hinge housing with reference to the second hinge-axis, is rotatably arranged between the first and the second hinge device, is set to interlock with the first hinge device at a first rotation angle so as to block a rotation operation of the first housing and allow a rotation operation of the second housing, and is set to interlock with the second hinge device at a second rotation angle so as to block a rotation operation of the second housing and allow a rotation operation of the first housing; and
a mode switch sliding device including a knob operable by a user and mechanically actuating the cam, such that movement of the knob controls rotation of the second housing from the first housing around the first hinge-axis or the second hinge-axis.

2. The electronic device as claimed in claim 1, wherein the cam is rotatably mounted around a third hinge-axis parallel to each of the first and the second hinge-axis.

3. The electronic device as claimed in claim 2, wherein the cam further comprises at least one auxiliary member placed on coaxially and a rotation shaft providing the third hinge-axis is arranged to extend through the auxiliary member.

4. The electronic device as claimed in claim 3, wherein the cam is rotatably installed around the third hinge-axis between one pair of brackets, and the brackets are movably arranged in a direction parallel to the first and the second hinge-axis by a guide.

5. The electronic device as claimed in claim 4, wherein each of the one pair of brackets facing each other has a movement hole formed therethrough, and the movement hole has a curvature to allow a shaft of the cam to be rotatable around the third hinge-axis.

6. The electronic device as claimed in claim 4, wherein the first hinge device comprises a first cam, which is interlocked with the cam and installed on a first hinge shaft providing the first hinge-axis, and
the second hinge device comprises a second cam, which is interlocked with the cam, is installed on a second hinge shaft providing the second hinge-axis, and faces the first cam.

7. The electronic device as claimed in claim 1, wherein the cam has a substantially cylindrical shape.

8. The electronic device as claimed in claim 6, wherein the first cam comprises:
a first one side cam recess, which includes a first one end surface and a first other end surface, is formed on an outer peripheral surface thereof, and extends in the direction of the first hinge-axis from the first one end surface; and
a first other side cam recess, which is formed on an outer peripheral surface thereof, is formed on a portion facing the first one side cam recess from an opposite direction of the first one side cam recess, and extends in the direction of the first hinge-axis from the other end surface.

9. The electronic device as claimed in claim 8, wherein the first one side cam recess has a first one side open end at the first one end surface and has a first one side closed end formed at a portion spaced a first distance from the first one side open end along the first hinge-axis, and
the first other side cam recess has a first other side open end at the first other end surface and has a first other side closed end formed at a portion spaced the first distance from the first other side open end in the direction of the first hinge-axis.

10. The electronic device as claimed in claim 8, wherein the second cam comprises:
a second one side cam recess, which has a second one end surface and a second other end surface, is formed on the outer peripheral surface thereof, and extends in the direction of the second hinge-axis from the second one end surface; and
a second other side cam recess, which is formed on the outer peripheral surface thereof, is formed on a portion facing the second one side cam recess from an opposite direction of the second one side cam recess, and extends in the direction of the second hinge-axis direction from the second other end surface.

11. The electronic device as claimed in claim 10, wherein the second one side cam recess has a second one side open end at the second one end surface and has a second one side closed end formed at a portion spaced a second distance from the second one side open end along the second hinge-axis, and
the second other side cam recess has a second other side open end at the second other end surface and has a second other side closed end formed at a portion spaced the second distance from the second other side open end in the direction of the second hinge-axis.

12. The electronic device as claimed in claim 6, wherein movement of the knob in a first direction rotates the first and second housings within first angle range, and movement of the knob in a second direction opposite to the first direction rotates the first and second housings within a second angle range different from the first angle range, and
wherein a maximum angle of the first angle range is less than a minimum angle of the second angle range.

13. The electronic device as claimed in claim 12, wherein the cam moves parallel to each of the first and the second hinge-axis by the mode switch sliding device, so as to interlock with the first cam or the second cam.

14. The electronic device as claimed in claim 13, wherein the mode switch sliding device is guided in the double-axis hinge housing; and
wherein the sliding knob is arranged to be exposed from the double-axis hinge housing and is operated by a user, and
at least one sliding guide connection member which moves inside the double-axis hinge housing in a lengthwise direction of the double-axis hinge housing in accordance with the movement of the sliding knob, and both ends of which are fastened to the brackets, respectively.

15. The electronic device as claimed in claim 12, wherein the first angle range is between 0 degree to 180 degrees and the second angle range is between 180 degrees to 360 degrees.

16. An electronic device comprising:
a first housing;
a second housing; and
a double-axis hinge housing connecting the first housing and the second housing such that the second housing can rotate from the first housing around a first hinge-axis or a second hinge-axis parallel to the first hinge-axis,
wherein the double-axis hinge housing comprises:
a first hinge device which rotatably connects the first housing and the double-axis hinge housing with reference to the first hinge-axis; and
a cam, which receives a double-axis hinge device including a second hinge device parallel to the first hinge device and rotatably connecting the second housing and the double-axis hinge housing with reference to the second hinge-axis, is rotatably arranged between the first and the second hinge device, is set to interlock with the first hinge device at a first rotation angle so as to block a rotation operation of the first housing and allow a rotation operation of the second housing, and is set to interlock with the second hinge device at a second rotation angle so as to block a rotation operation of the second housing and allow a rotation operation of the first housing,
wherein the cam is rotatably installed around the third hinge-axis between one pair of brackets, and the brackets are movably arranged in a direction parallel to the first and the second hinge-axis by a guide.

* * * * *